US012658604B2

(12) United States Patent
Fujii et al.

(10) Patent No.: US 12,658,604 B2
(45) Date of Patent: Jun. 16, 2026

(54) VEHICULAR ANTENNA DEVICE

(71) Applicant: YOKOWO CO., LTD., Tokyo (JP)

(72) Inventors: Ryosuke Fujii, Tomioka (JP); Kenji Hayakawa, Tomioka (JP); Seiya Hiroki, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 79 days.

(21) Appl. No.: 18/692,188

(22) PCT Filed: Aug. 30, 2022

(86) PCT No.: PCT/JP2022/032497

§ 371 (c)(1),
(2) Date: Mar. 14, 2024

(87) PCT Pub. No.: WO2023/053818

PCT Pub. Date: Apr. 6, 2023

(65) Prior Publication Data

US 2024/0388012 A1 Nov. 21, 2024

(30) Foreign Application Priority Data

Sep. 30, 2021 (JP) ................................. 2021-162413

(51) Int. Cl.

| | |
|---|---|
| ***H01Q 21/28*** | (2006.01) |
| ***H01Q 1/14*** | (2006.01) |
| ***H01Q 1/24*** | (2006.01) |
| ***H01Q 1/32*** | (2006.01) |

(52) U.S. Cl.

CPC ............... *H01Q 21/28* (2013.01); *H01Q 1/14* (2013.01); *H01Q 1/24* (2013.01); *H01Q 1/32* (2013.01)

(58) Field of Classification Search

CPC ........ H01Q 21/28; H01Q 1/14; H01Q 1/3291; H01Q 1/24; H01Q 1/32

See application file for complete search history.

(56) References Cited

U.S. PATENT DOCUMENTS

| | | | | |
|---|---|---|---|---|
| 6,191,751 | B1 * | 2/2001 | Johnson | H01Q 1/3291 343/834 |
| 9,054,429 | B2 * | 6/2015 | Kashiwagi | H01Q 21/28 |
| 11,018,411 | B2 * | 5/2021 | Nguyen | H01Q 1/24 |
| 2003/0156070 | A1 * | 8/2003 | Ooe | H01Q 21/28 343/713 |
| 2017/0324141 | A1 * | 11/2017 | Talty | H01Q 1/3291 |
| 2021/0234284 | A1 * | 7/2021 | Sampo | H01Q 19/108 |
| 2023/0146537 | A1 | 5/2023 | Sampo et al. | |
| 2024/0243487 | A1 * | 7/2024 | Sone | H01Q 9/28 |

FOREIGN PATENT DOCUMENTS

| | | | |
|---|---|---|---|
| JP | 2008-271271 | A | 11/2008 |
| WO | WO 2020/027156 | A1 | 2/2020 |

* cited by examiner

*Primary Examiner* — Hai V Tran

(74) *Attorney, Agent, or Firm* — Paratus Law Group, PLLC

(57) ABSTRACT

Electrical performance of a vehicular antenna device constant is kept constant. A vehicular antenna device 1 includes: a first antenna 31; a second antenna 32; a first cable 35 for the first antenna 31; a second cable 36 for the second antenna 32; and a housing 10 that holds the first antenna 31 and the second antenna 32. The first cable 35 and the second cable 36 are held in a predetermined region of one surface of the housing 10.

7 Claims, 15 Drawing Sheets

VEHICULAR ANTENNA DEVICE

CROSS REFERENCE TO PRIOR APPLICATION

This application is a National Stage Patent Application of PCT International Patent Application No. PCT/JP2022/032497 (filed on Aug. 30, 2022) under 35 U.S.C. § 371, which claims priority to Japanese Patent Application No. 2021-162413 (filed on Sep. 30, 2021), which are all hereby incorporated by reference in their entirety.

TECHNICAL FIELD

The present invention relates to a vehicular antenna device.

BACKGROUND ART

Conventionally, as in Patent Literature 1, for example, a vehicular antenna device including a cable connected to an electric device of a vehicle has been proposed.

CITATION LIST

Patent Literature

Patent Literature 1: JP-A-2003-17916

SUMMARY OF INVENTION

Technical Problem

However, in a case where there is a plurality of cables, there is a possibility that the electrical performance of the vehicular antenna device varies depending on the way of bundling of the plurality of cables.

Therefore, an example of an object of the present invention is to keep the electrical performance of the vehicular antenna device constant.

Solution to Problem

An vehicular antenna device according to the present invention includes: a first antenna; a second antenna; a first cable for the first antenna; a second cable for the second antenna; and a housing that holds the first antenna and the second antenna. The first cable and the second cable are held in a predetermined region of one surface of the housing.

As described above, according to the present invention, the electrical performance of the vehicular antenna device can be kept constant.

DESCRIPTION OF EMBODIMENTS

Hereinafter, the present embodiment will be described with reference to the drawings. Note that the embodiment is not limited to the following embodiment. In addition, the contents described in one embodiment are similarly applied to other embodiments in principle. Further, each embodiment and each modification can be appropriately combined.

Figure 1:
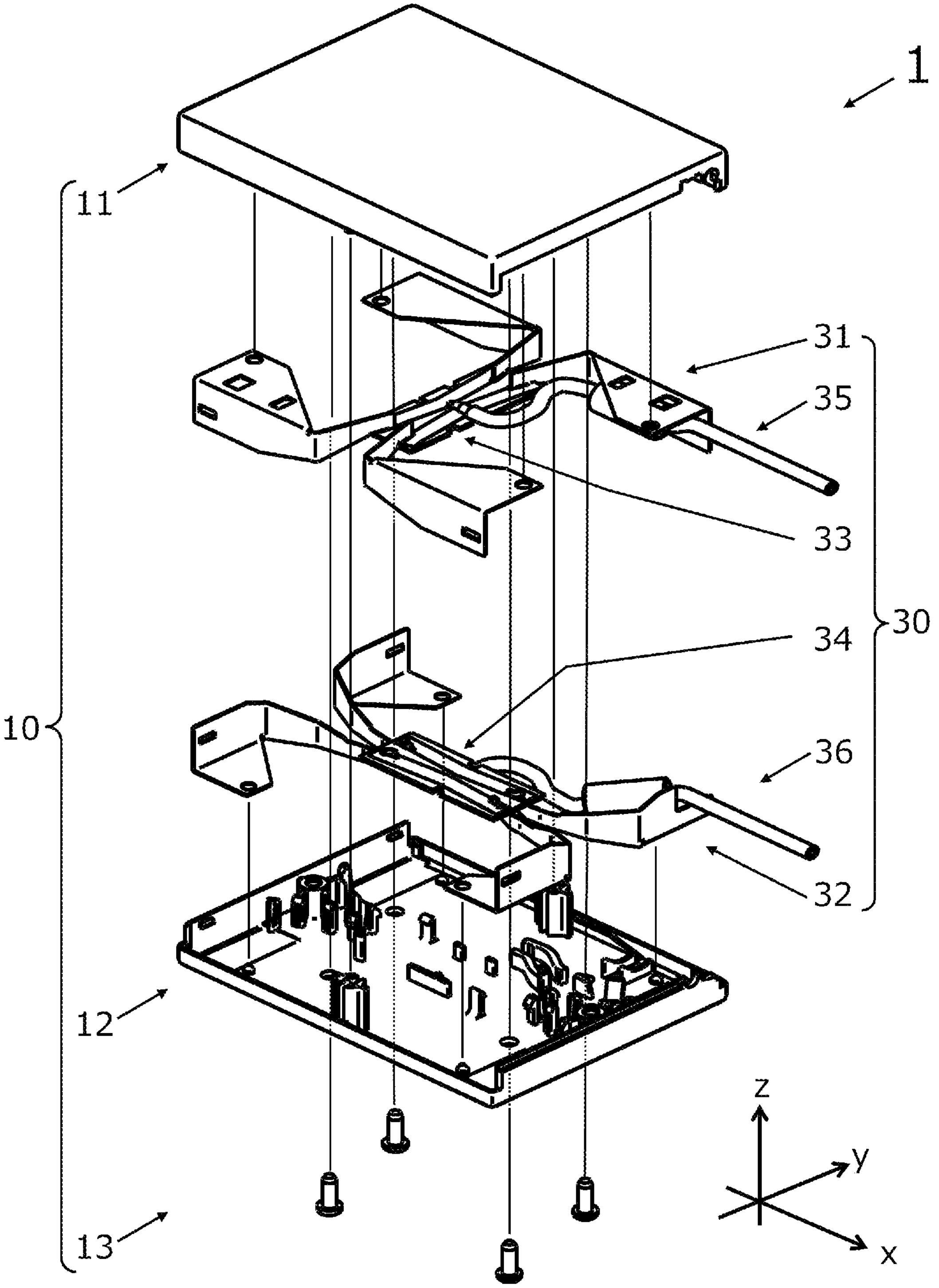
FIG. 1 is an exploded perspective view of a vehicular antenna device of the present embodiment as viewed from above.

In order to describe the directions, an x direction, a y direction, and a z direction are defined. The z direction is a direction in which a first case 11 and a second case 12 are arranged side by side. The x direction is one of horizontal directions perpendicular to the z direction. The y direction is one of horizontal directions perpendicular to the z direction and the x direction. In the present embodiment, the description will be given on the assumption that the x direction is the front-rear direction, the y direction is the left-right direction, and the z direction is the up-down direction. In FIG. 1 and the like, directions indicated by arrows of the x axis, the y axis, and the z axis are defined as a forward direction, a left direction, and an upward direction, respectively. The front-rear direction of a vehicle to which a vehicular antenna device 1 of the present embodiment is attached may or may not coincide with the x direction.

Figure 12:
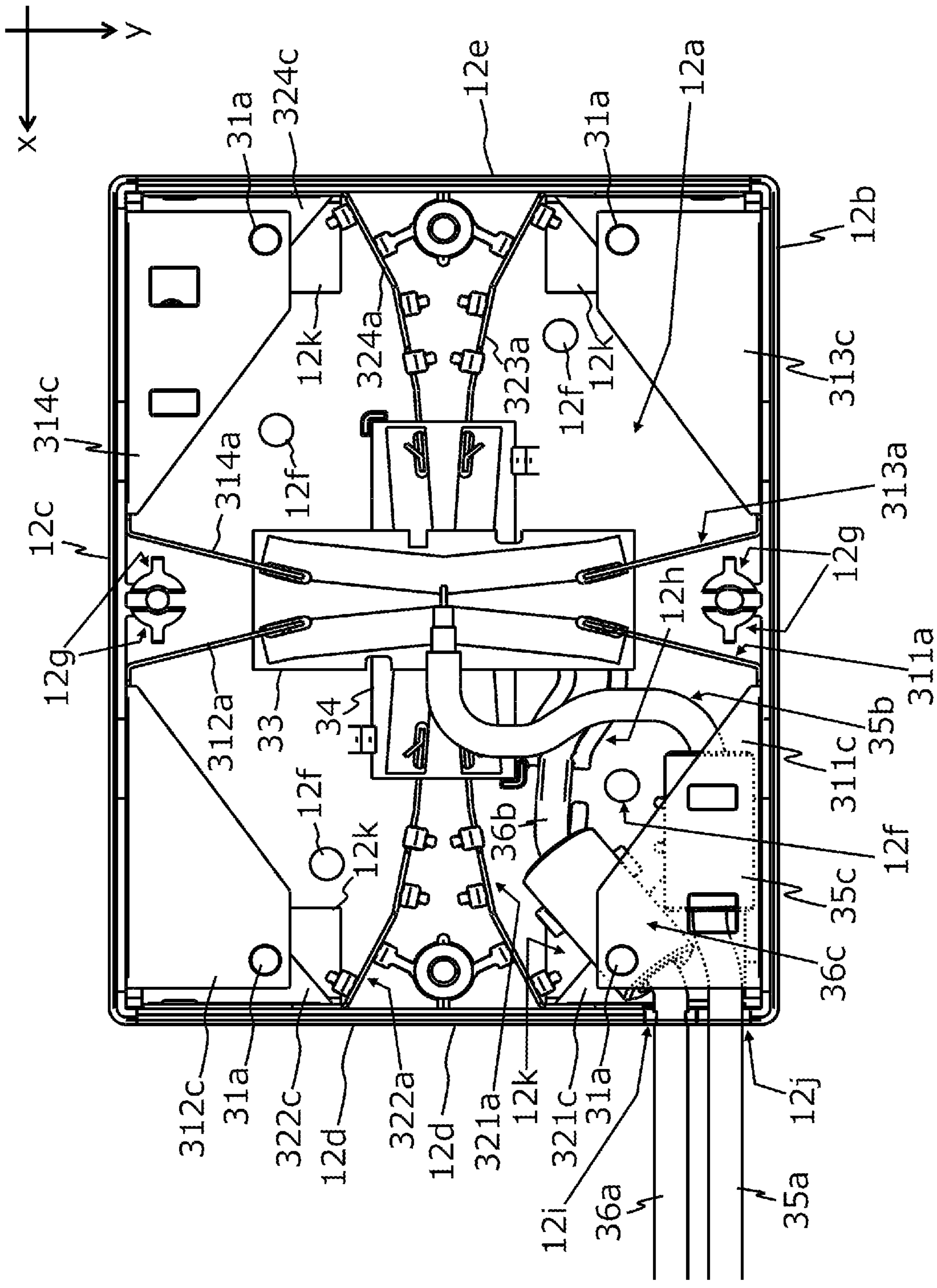
FIG. 12 is a top view of the vehicular antenna device from which the first case and screws are removed.

In the top view of FIG. 12, for easy understanding of the internal structure of the vehicular antenna device 1, illustration of an upper surface portion 11*a* to which a first antenna 31 is originally attached is omitted. In addition, a member (such as a first ferrite core 35*c*) that is originally hidden behind an eleventh upper portion 311*c* and cannot be seen is indicated by a dotted line.

The first direction described in the claims corresponds to the z direction of the present embodiment. The second direction described in the claims corresponds to the y direction of the present embodiment. The first wall surface described in the claims corresponds to a first left side surface portion 11*b*, a first right side surface portion 11*c*, a first front surface portion 11*d*, and a first rear surface portion 11*e* of the present embodiment. The second wall surface described in the claims corresponds to a second left side surface portion 12*b*, a second right side surface portion 12*c*, a second front surface portion 12*d*, and a second rear surface portion 12*e* of the present embodiment. In addition, the first side portion described in the claims corresponds to an eleventh side portion 311*b*, a twelfth side portion 312*b*, a thirteenth side portion 313*b*, and a fourteenth side portion 314*b* of the present embodiment. In addition, the second side portion described in the claims corresponds to a twenty-first side portion 321*b*, a twenty-second side portion 322*b*, a twenty-third side portion 323*b*, and a twenty-fourth side portion 324*b* of the present embodiment.

(Region to which Vehicular Antenna Device 1 is Attached)

The vehicular antenna device 1 according to the present embodiment is provided inside an instrument panel of a vehicle, for example.

(Vehicular Antenna Device 1)

As illustrated in FIG. 1, the vehicular antenna device 1 includes a housing 10 and an antenna unit 30.

(Housing 10)

The housing 10 includes a first case 11, a second case 12, and screws 13. The first case 11 and the second case 12 sandwich the antenna unit 30 in the z direction. The first case 11 and the second case 12 are fixed with the screws 13.

(Antenna Unit 30)

The antenna unit 30 includes the first antenna 31, a second antenna 32, a first substrate 33, a second substrate 34, a first cable 35, and a second cable 36.

(First Case 11)

Figure 2:
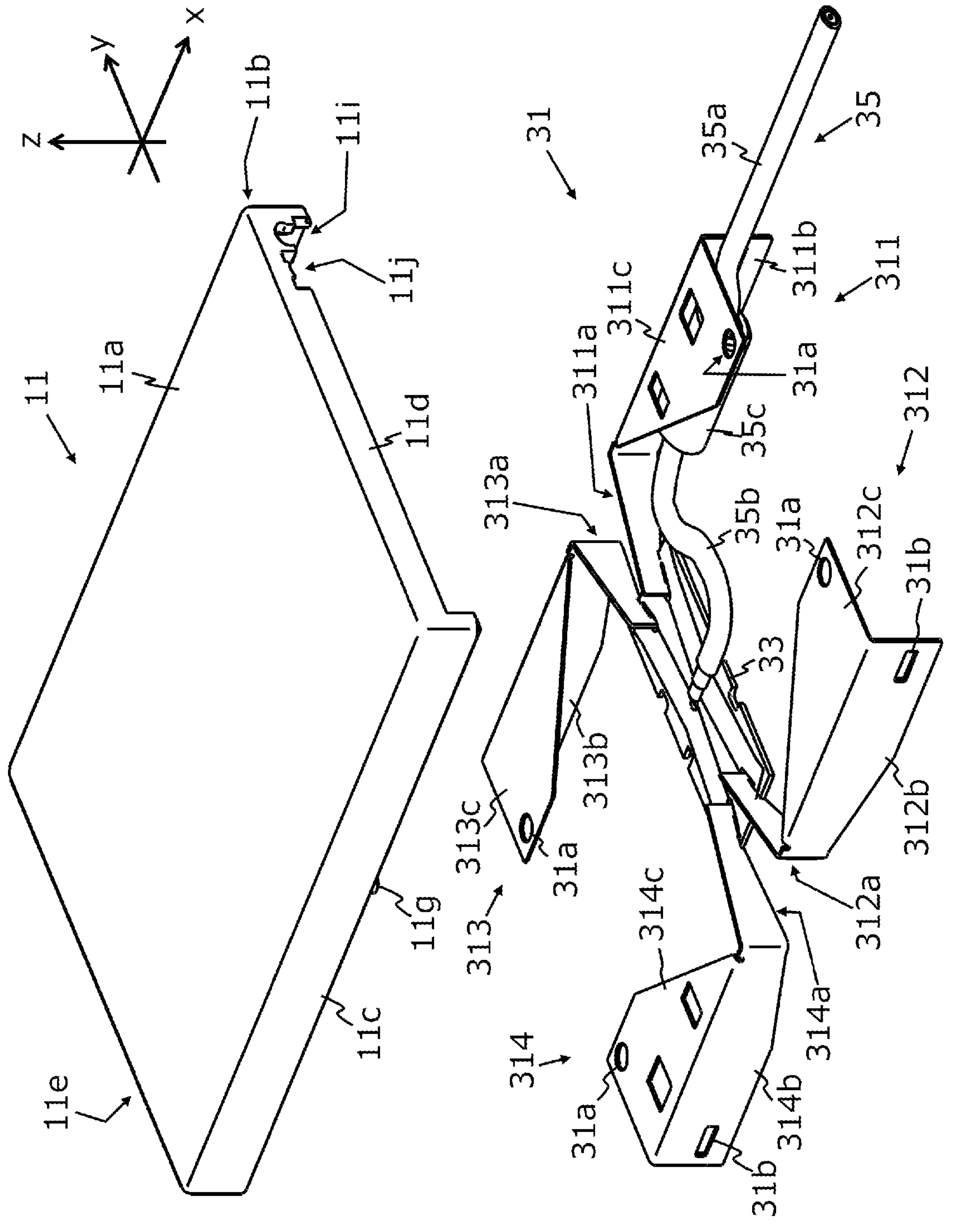
FIG. 2 is a perspective view of a first case and an assembly of a first antenna, a first substrate, and a first cable as viewed from above.
Figure 3:
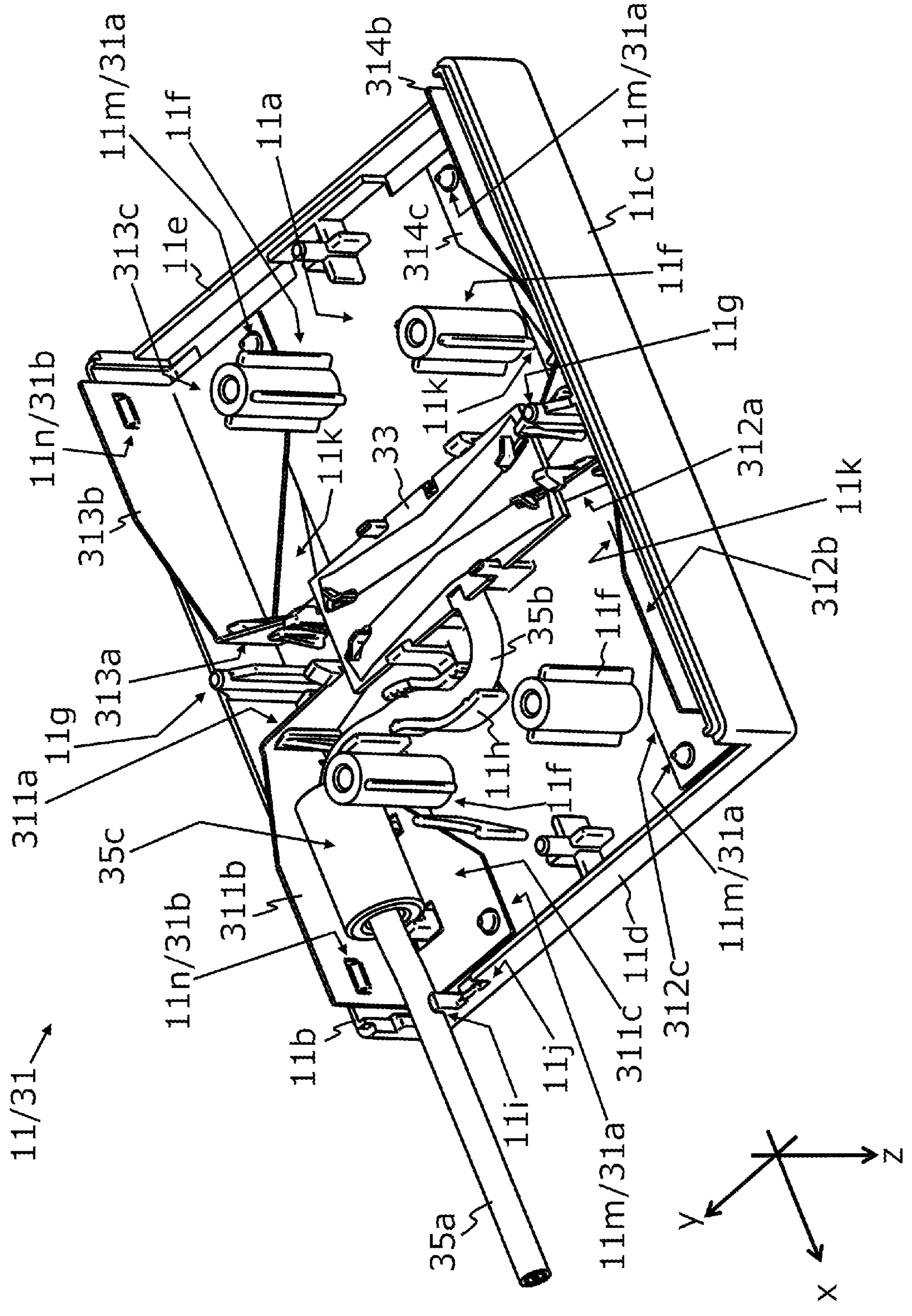
FIG. 3 is a perspective view of the first case to which the first antenna, the first substrate, and the first cable are attached as viewed from below.

The first case 11 has a substantially rectangular parallelepiped outer shape. As illustrated in FIG. 2 and FIG. 3, the first case 11 includes the upper surface portion 11*a*, the first left side surface portion 11*b*, the first right side surface portion 11*c*, the first front surface portion 11*d*, and the first rear surface portion 11*e*. The first case 11 holds the first antenna 31, the first substrate 33, and the first cable 35.

(Upper Surface Portion 11*a*)

The upper surface portion 11*a* forms an upper surface of the first case 11. On the lower surface of the upper surface portion 11*a*, bosses 11*f*, a first attachment guide portion 11*g*, a first cable guide portion 11*h*, first inclined regions 11*k*, and first pins 11*m* are provided.

(First Left Side Surface Portion 11*b*)

The first left side surface portion 11*b* extends downward in the z direction from a left end portion of the upper surface portion 11*a*, and forms a left side surface of the first case 11. On the inner surface of the first left side surface portion 11*b*, first claws 11*n* for attaching an eleventh element 311 and a thirteenth element 313 is provided.

(First Right Side Surface Portion 11*c*)

The first right side surface portion 11*c* extends downward in the z direction from a right end portion of the upper surface portion 11*a*, and forms a right side surface of the first case 11. On the inner surface of the first right side surface portion 11*c*, first claws 11*n* for attaching a twelfth element 312 and a fourteenth element 314 are provided.

(First Front Surface Portion 11*d*)

The first front surface portion 11*d* extends downward in the z direction from a front end portion of the upper surface portion 11*a*, and forms a front surface of the first case 11. A first cable holding portion 11*i* and a first holding portion receiving region 11*j* are provided at a lower left end of the first front surface portion 11*d*.

(First Rear Surface Portion 11*e*)

The first rear surface portion 11*e* extends downward in the z direction from a rear end portion of the upper surface portion 11*a*, and forms a rear surface of the first case 11.

(Bosses 11*f*)

The bosses 11*f* protrude downward in the z direction from the lower surface of the upper surface portion 11*a*, and are used for fixing to the second case 12 using the screws 13.

(First Attachment Guide Portion 11*g*)

Figure 4:
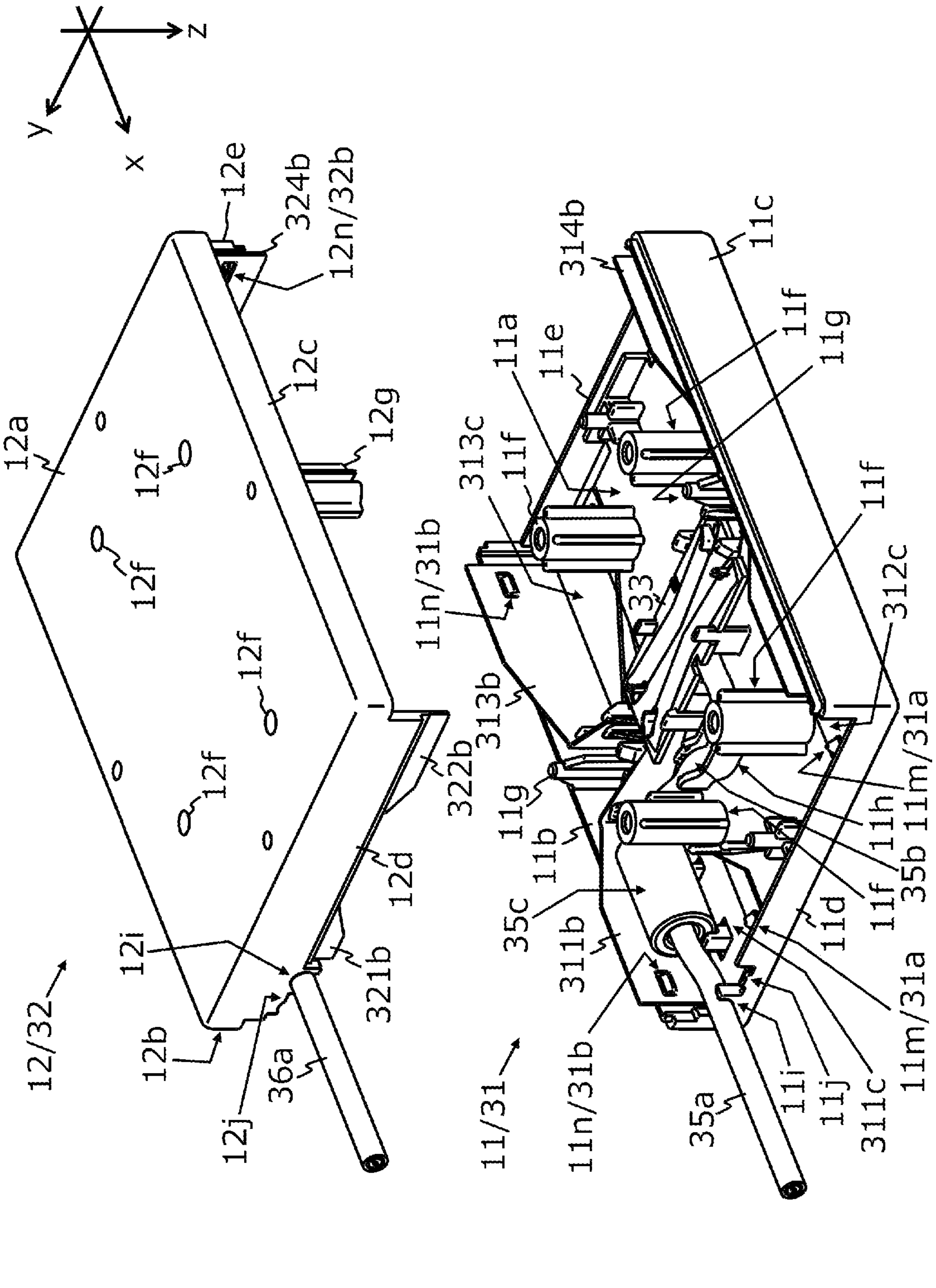
FIG. 4 is a perspective view of the first case to which the first antenna, the first substrate, and the first cable are attached, and a second cable to which a second antenna, a second substrate, and a second cable are attached as viewed from below.

The first attachment guide portion 11*g* is provided in the vicinity of the center in the x direction of the first left side surface portion 11*b* and in the vicinity of the center in the x direction of the first right side surface portion 11*c*. The first attachment guide portion 11*g* provided in the vicinity of the first left side surface portion 11*b* protrudes downward in the z direction compared to the first left side surface portion 11*b*. The first attachment guide portion 11*g* provided in the vicinity of the first left side surface portion 11*b* is fitted to a second attachment guide portion 12*g* provided in the vicinity of the second left side surface portion 12*b* of the second case 12. As illustrated in FIG. 4, the first attachment guide portion 11*g* provided in the vicinity of the first right side surface portion 11*c* protrudes downward in the z direction compared to the first right side surface portion 11*c*. The first attachment guide portion 11*g* provided in the vicinity of the first right side surface portion 11*c* is fitted to the second attachment guide portion 12*g* provided in the vicinity of the second right side surface portion 12*c* of the second case 12.

(First Cable Guide Portion 11*h*)

The first cable guide portion 11*h* has a wall shape protruding downward in the z direction from the lower surface of the upper surface portion 11*a* (see FIG. 3). The first cable guide portion 11*h* is provided in the vicinity of an eleventh arm portion 311*a* of the eleventh element 311. The first cable guide portion 11*h* has a curved shape when viewed from the z direction. The first cable guide portion 11*h* is used to bend a first distal end region 35*b* of the first cable 35 and hold and position the first distal end region 35*b* of the first cable 35 along the eleventh arm portion 311*a* and the eleventh side portion 311*b* of the eleventh element 311. In addition, the first cable guide portion 11*h* bends the first distal end region 35*b* of the first cable 35 so as to avoid physical interference with the second cable 36 such as the first ferrite core 35*c* of the first cable 35 and so that the signal line at the distal end portion of the first distal end region 35*b* is parallel to the x direction (see FIG. 2 and FIG. 3).

(First Cable Holding Portion 11*i*)

The first cable holding portion 11*i* includes a cable clip that clamps a first body portion 35*a* of the first cable 35.

(First Holding Portion Receiving Region 11*j*)

The first holding portion receiving region 11*j* has a recessed region into which a second cable holding portion 12*i* of the second front surface portion 12*d* of the second case 12 is fitted.

(Positional Relationship Between First Cable Holding Portion 11*i* and First Holding Portion Receiving Region 11*j*)

The first cable holding portion 11*i* is provided at a position closer to the first left side surface portion 11*b* than the first holding portion receiving region 11*j*. The first cable holding portion 11*i* and the first holding portion receiving region 11*j* are adjacent in the y direction and are configured to be located at substantially the same height in the z direction.

(First Inclined Regions 11*k*)

Four first inclined regions 11*k* are provided on the lower surface of the upper surface portion 11*a*.

Figure 5:
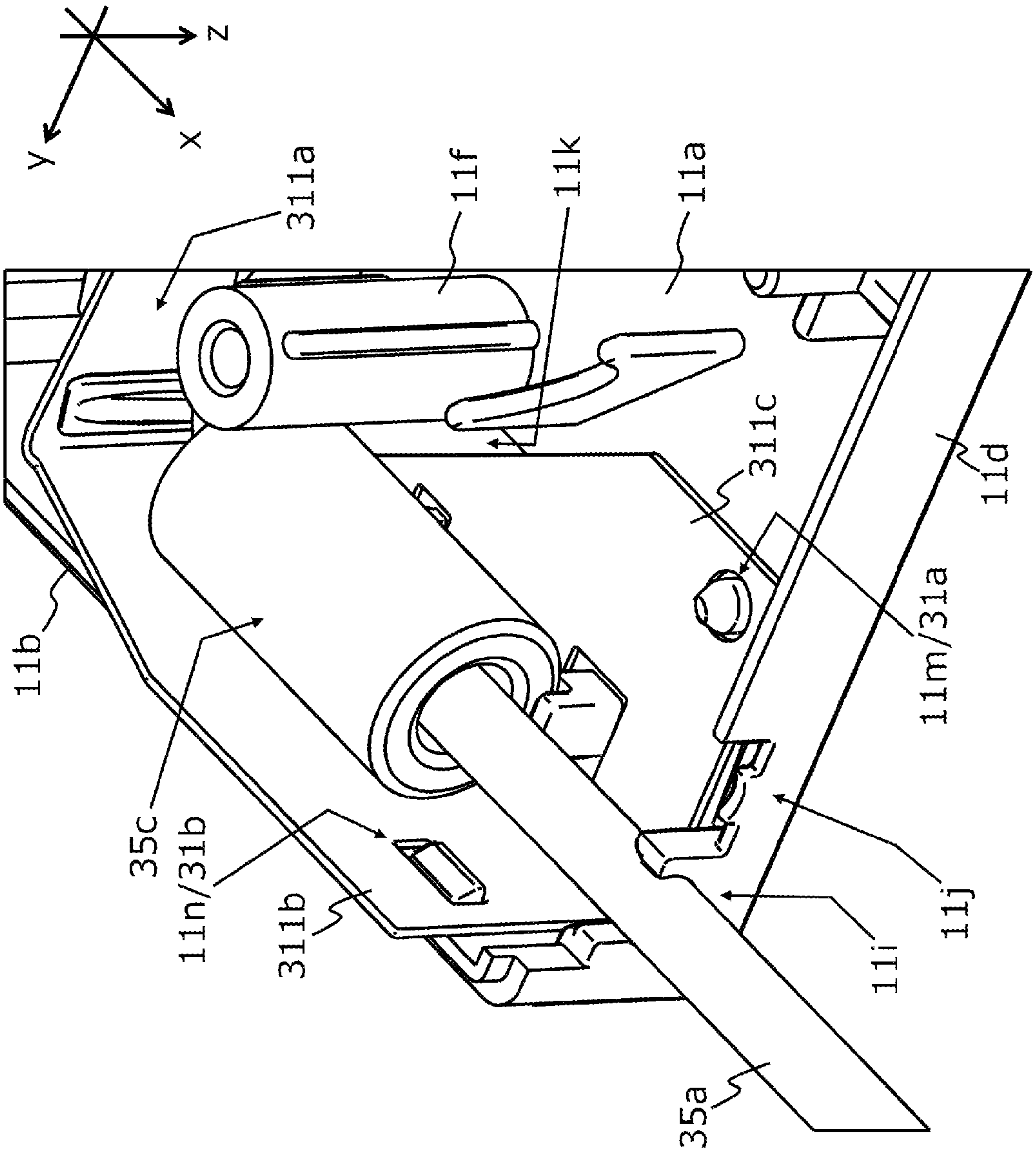
FIG. 5 is an enlarged perspective view of a region where a first cable holding portion is provided in the first case to which the first antenna and the first cable are attached as viewed from below.
Figure 6:
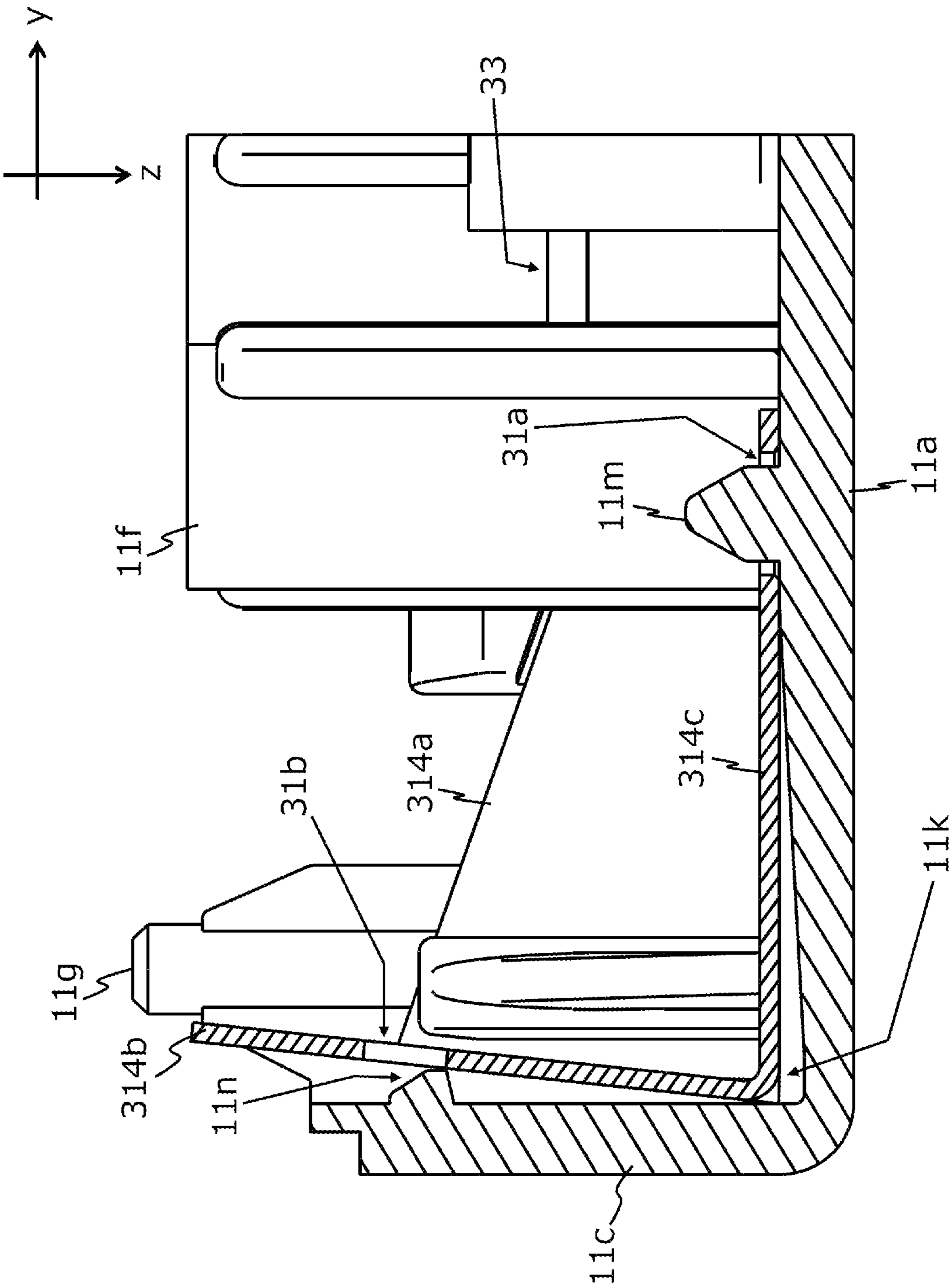
FIG. 6 is a cross-sectional configuration diagram of a portion of the first case where a fourteenth element is present when viewed from a x direction in a first pushing process.
Figure 7:
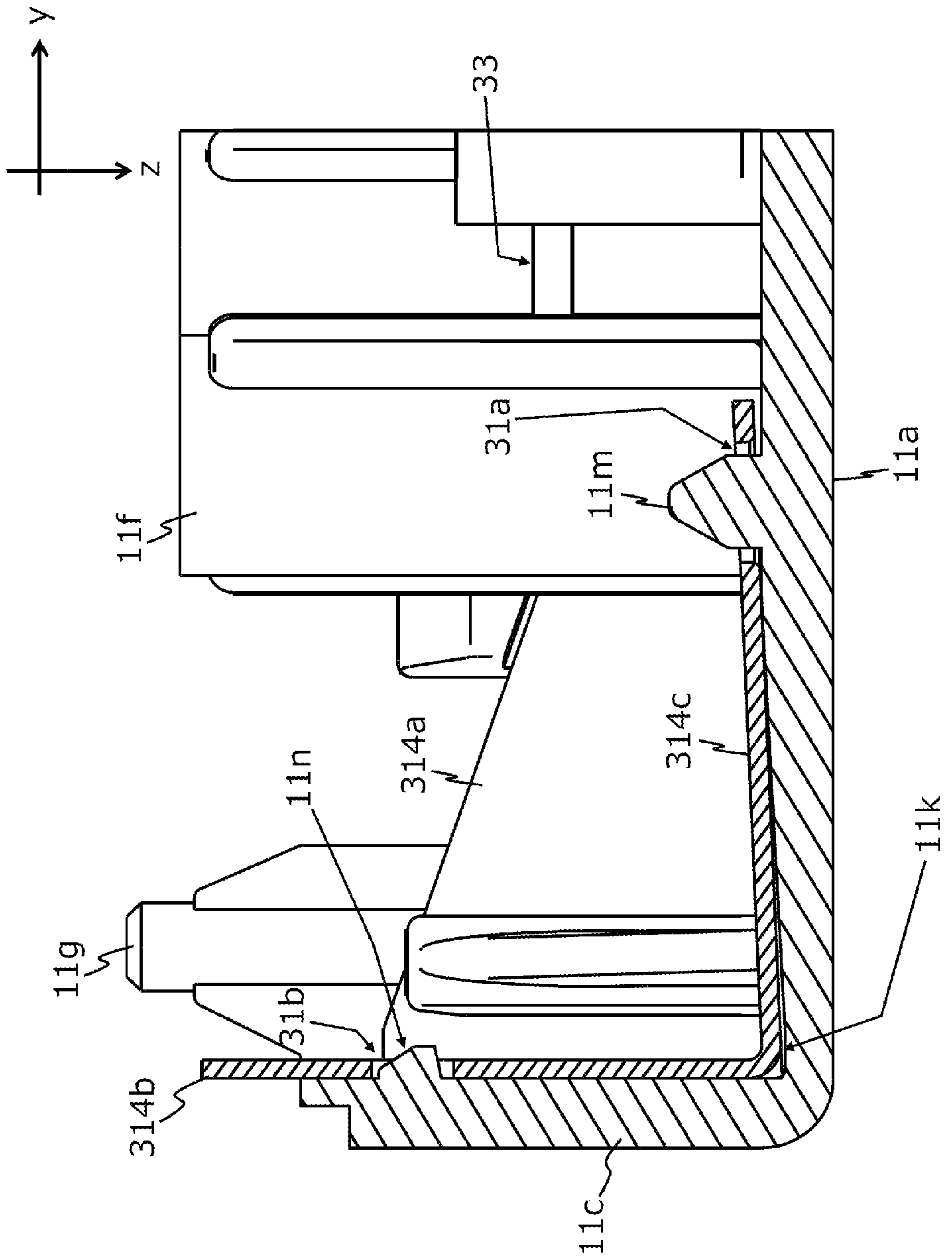
FIG. 7 is a cross-sectional configuration diagram of a portion of the first case where the fourteenth element is present when viewed from the x direction in a first claw insertion process.
Figure 8:
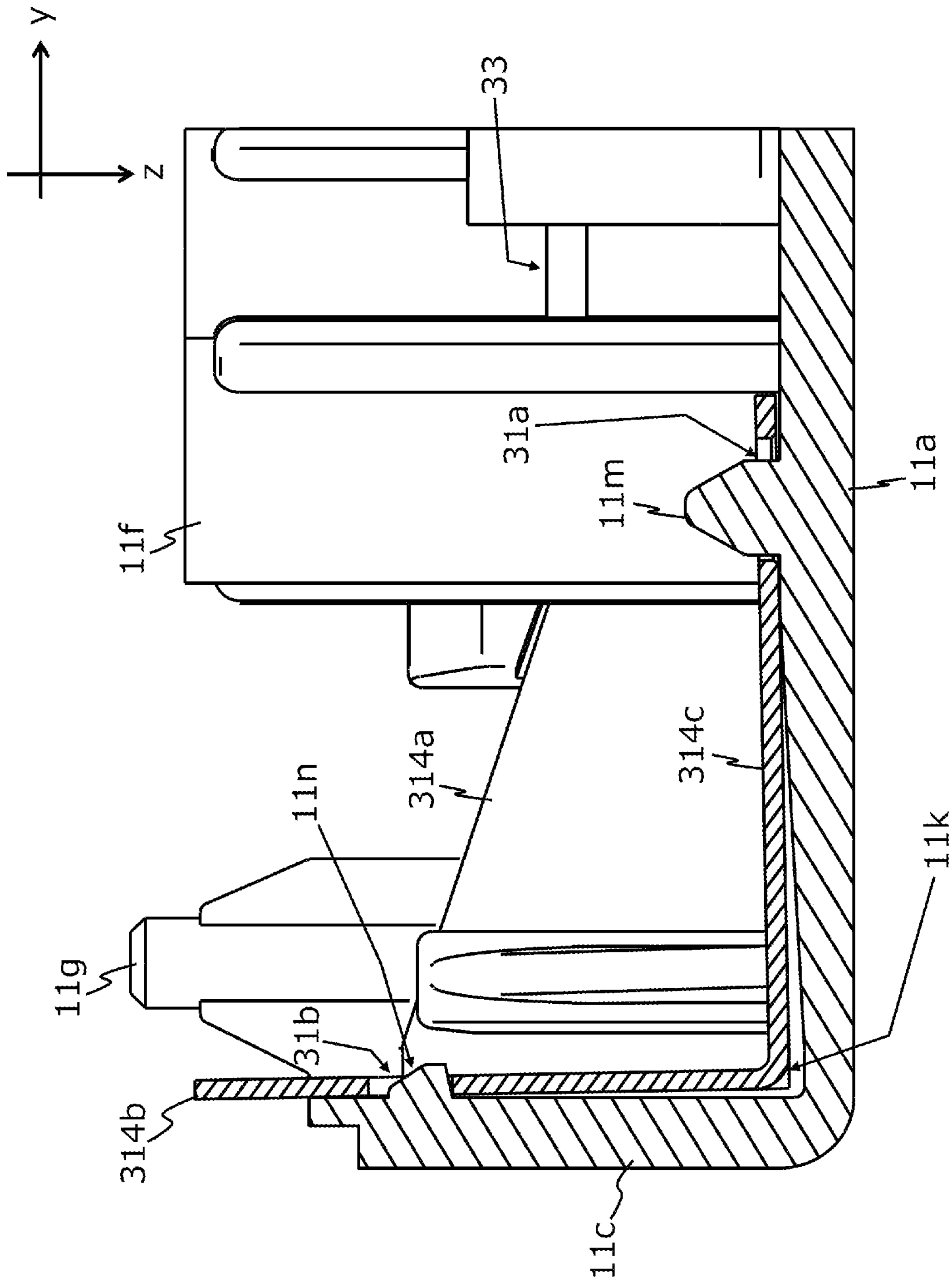
FIG. 8 is a cross-sectional configuration diagram of a portion of the first case where the fourteenth element is present as viewed from the x direction in a first hooking process.
Figure 9:
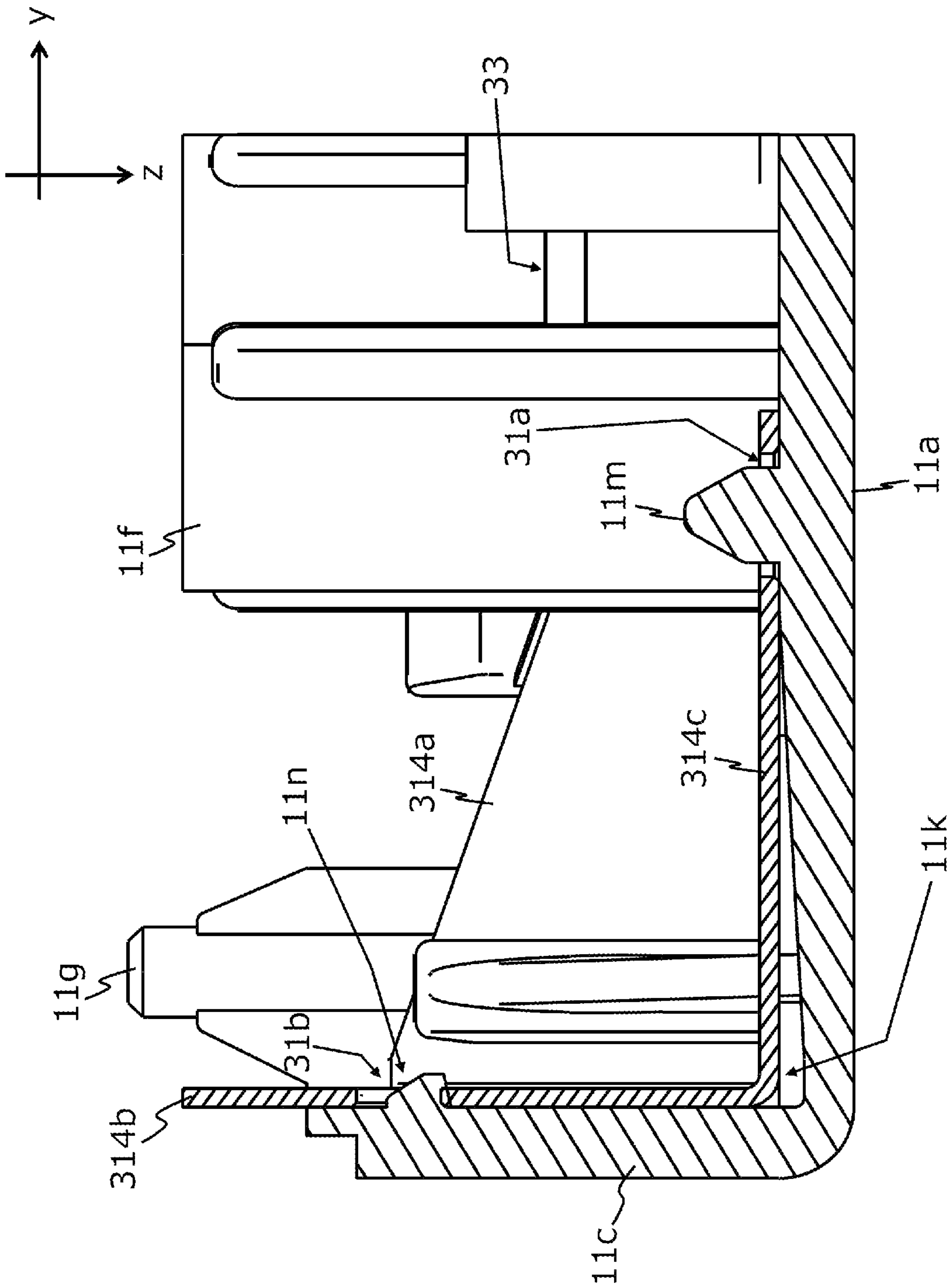
FIG. 9 is a cross-sectional configuration diagram of a portion of the first case where the fourteenth element is present when viewed from the x direction after completion of the first hooking process.

As illustrated in FIG. 5, the first inclined region 11*k* for temporarily accommodating the eleventh upper portion 311*c* of the eleventh element 311 is provided on the front side of the left end portion of the lower surface of the upper surface portion 11*a*. In the first inclined region 11*k* on the front side of the left end portion of the lower surface of the upper surface portion 11*a*, an inclination (for example, an inclination such that the thickness of the upper surface portion 11*a* in the z direction becomes thin) is formed such that the recess in the z direction increases toward the first left side surface portion 11*b*. The first inclined region 11*k* for temporarily accommodating a twelfth upper portion 312*c* of the twelfth element 312 is provided on the front side of the right end portion of the lower surface of the upper surface portion 11*a* (see FIG. 3). In the first inclined region 11*k* on the front side of the right end portion of the lower surface of the upper surface portion 11*a*, an inclination (for example, an inclination such that the thickness of the upper surface portion 11*a* in the z direction becomes thin) is formed such that the recess in the z direction increases toward the first right side surface portion 11*c*.

The first inclined region 11*k* for temporarily accommodating a thirteenth upper portion 313*c* of the thirteenth element 313 is provided on the rear side of the left end portion of the lower surface of the upper surface portion 11*a*. In the first inclined region 11*k* on the rear side of the left end portion of the lower surface of the upper surface portion 11*a*, an inclination (for example, an inclination such that the thickness of the upper surface portion 11*a* in the z direction becomes thin) is formed such that the recess in the z direction increases toward the first left side surface portion 11*b*. As illustrated in FIG. 6 to FIG. 9, the first inclined region 11*k* for temporarily accommodating a fourteenth upper portion 314*c* of the fourteenth element 314 is provided on the rear side of the right end portion of the lower surface of the upper surface portion 11*a*. In the first inclined region 11*k* on the rear side of the right end portion of the lower surface of the upper surface portion 11*a*, an inclination (for example, an inclination such that the thickness of the upper surface portion 11*a* in the z direction becomes thin) is formed such that the recess in the z direction increases toward the first right side surface portion 11*c*.

(Application Example of Usage of First Inclined Region 11*k*)

In the present embodiment, an example will be described in which the first inclined region 11*k* temporarily accommodates the eleventh upper portion 311*c* and the like, and the eleventh upper portion 311*c* and the like are separated from the first inclined region 11*k* in a first hooking process to be described later. However, when the eleventh upper portion 311*c* and the like are larger than a predetermined dimension due to tolerance, the first inclined region 11*k* may be used as a region for accommodating at least a part of the eleventh upper portion 311*c* and the like even after attachment.

(First Pins 11*m*)

Four first pins 11*m* are provided on the lower surface of the upper surface portion 11*a*.

Each of the four first pins 11*m* includes a protrusion protruding downward in the z direction from the lower surface of the upper surface portion 11*a*.

In the vicinity of the first inclined region 11*k* on the front side of the left end portion of the lower surface of the upper surface portion 11*a*, the first pin 11*m* to be inserted into a first pin hole 31*a* provided in the eleventh upper portion 311*c* of the eleventh element 311 is provided (see FIG. 5). In the vicinity of the first inclined region 11*k* on the front side of the right end portion of the lower surface of the upper surface portion 11*a*, the first pin 11*m* to be inserted into a first pin hole 31*a* provided in the twelfth upper portion 312*c* of the twelfth element 312 is provided (see FIG. 3). In the vicinity of the first inclined region 11*k* on the rear side of the left end portion of the lower surface of the upper surface portion 11*a*, the first pin 11*m* to be inserted into a first pin hole 31*a* provided in the thirteenth upper portion 313*c* of the thirteenth element 313 is provided. In the vicinity of the first inclined region 11*k* on the rear side of the right end portion of the lower surface of the upper surface portion 11*a*, the first pin 11*m* to be inserted into a first pin hole 31*a* provided in the fourteenth upper portion 314*c* of the fourteenth element 314 is provided (see FIG. 6 to FIG. 9).

(First Claws 11*n*)

Two first claws 11*n* are provided on the inner surface of the first left side surface portion 11*b*, and two first claws 11*n* are provided on the inner surface of the first right side surface portion 11*c*. Each of the two first claws 11*n* provided on the first left side surface portion 11*b* includes a protrusion protruding to the right side in the y direction from the inner surface of the first left side surface portion 11*b*. Each of the two first claws 11*n* provided on the first right side surface portion 11*c* includes a protrusion protruding to the left side in the y direction from the inner surface of the first right side surface portion 11*c*. In order to hook first claw holes 31*b*, each of the four first claws 11*n* has a flat surface whose upper end is perpendicular to the z direction or an inclined surface approaching the upper surface portion 11*a* as being separated from the inner surface.

On the front side in the x direction of the first left side surface portion 11*b*, the first claw 11*n* to be inserted into a first claw hole 31*b* provided in the eleventh side portion 311*b* of the eleventh element 311 is provided (see FIG. 3). On the rear side in the x direction of the first left side surface portion 11*b*, a first claw 11*n* to be inserted into a first claw hole 31*b* provided in the thirteenth side portion 313*b* of the thirteenth element 313 is provided. Similarly, on the front side in the x direction of the first right side surface portion 11*c*, a first claw 11*n* to be inserted into a first claw hole 31*b* provided in the twelfth side portion 312*b* of the twelfth element 312 is provided (not illustrated). Similarly, on the rear side in the x direction of the first right side surface portion 11*c*, a first claw 11*n* to be inserted into a first claw hole 31*b* provided in the fourteenth side portion 314*b* of the fourteenth element 314 is provided (see FIG. 6 to FIG. 9).

(Positional Relationship Among First Inclined Region 11*k*, First Pin 11*m*, and First Claw 11*n*)

Dimensions of the first inclined region 11*k*, the first pin 11*m*, and the first claw 11*n* corresponding to one element of the first antenna 31 are determined under the following conditions. In a state where the first pin 11*m* is inserted into the first pin hole 31*a* in the upper portion of the element, said upper portion can be pushed into the first inclined region 11*k* (first pushing process, see FIG. 6). At this time, the element is bent such that the end portions of the upper portion and the side portion of said element approach each other, and the angle formed by the upper portion and the side portion of said element when viewed from the x direction becomes smaller than the vertical angle. In a state where the first pin 11*m* is inserted into the first pin hole 31*a* in said upper portion and said upper portion is pushed into the first inclined region 11*k*, the first claw 11*n* can be inserted into the first claw hole 31*b* in the side portion of said element (first claw insertion process, see FIG. 7). Thereafter, the state in which said upper portion is pushed into the first inclined region 11*k* is released by pulling down said side portion. At this time, the element tries to return to the original state, and the first claw 11*n* is hooked to the first claw hole 31*b* (first hooking process, see FIG. 8 and FIG. 9). The original state referred to herein is a state in which the upper portion and the side portion of the element are substantially vertical.

(Positional Relationship Between First Left Side Surface Portion 11*b* and First Claw 11*n*)

It is desirable that the two first claws 11*n* provided on the first left side surface portion 11*b* be located closer to the end portion on the lower side in the z direction of the first left side surface portion 11*b*. That is, the two first claws 11*n* provided on the first left side surface portion 11*b* are located in a region closer to the end portion on the lower side in the z direction of the first left side surface portion 11*b* than the upper surface portion 11*a*.

(Positional Relationship Between First Right Side Surface Portion 11*c* and First Claw 11*n*)

It is desirable that the two first claws 11*n* provided on the first right side surface portion 11*c* be located closer to the end portion on the lower side in the z direction of the first right side surface portion 11*c*. That is, the two first claws 11*n* provided on the first right side surface portion 11*c* are located in a region closer to the end portion on the lower side in the z direction of the first right side surface portion 11*c* than the upper surface portion 11*a*.

(Second Case 12)

The second case 12 has a substantially rectangular parallelepiped outer shape.

Figure 10:
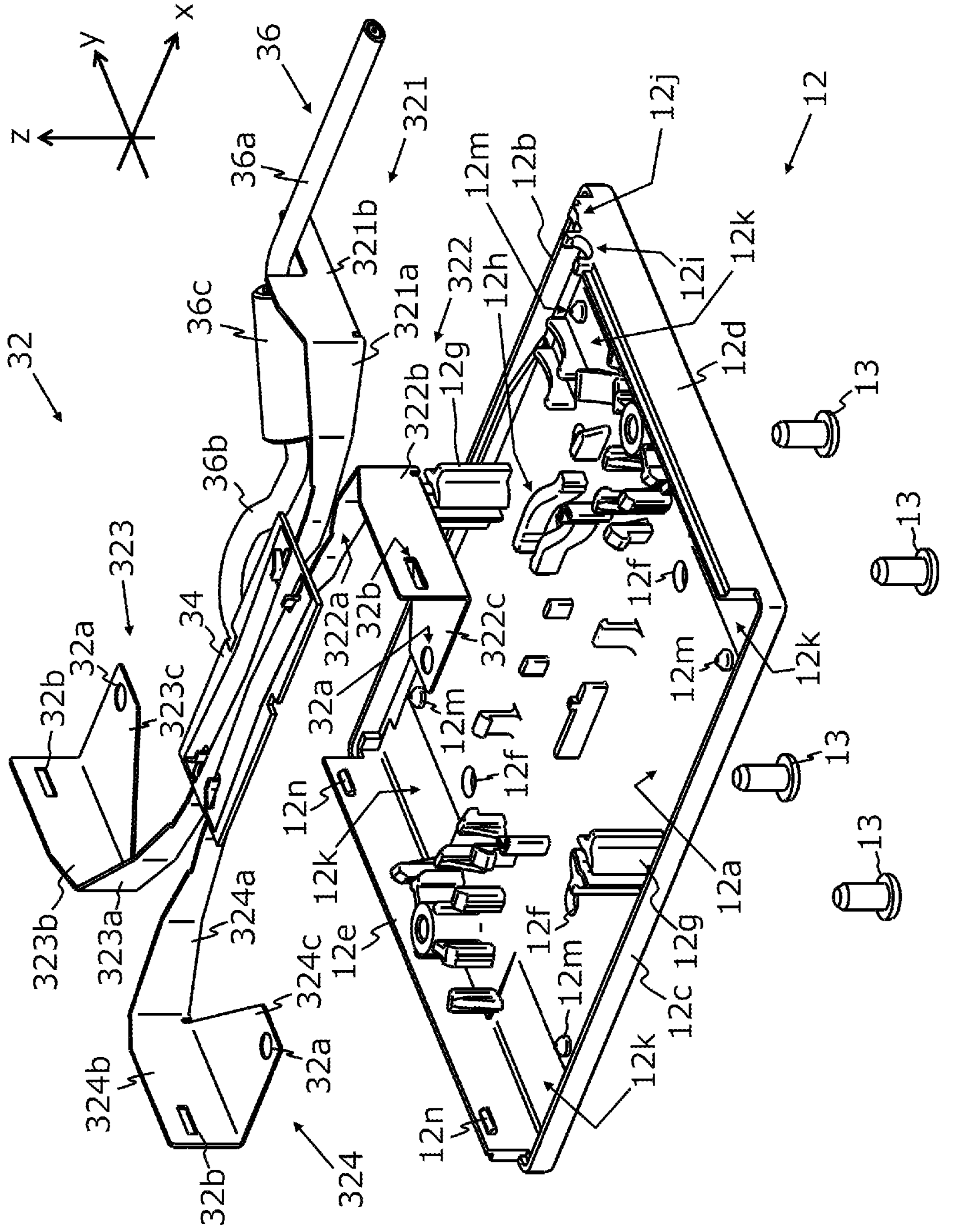
FIG. 10 is a perspective view of an assembly of the second antenna, the second substrate, and the second cable, and a second case as viewed from above.
Figure 11:
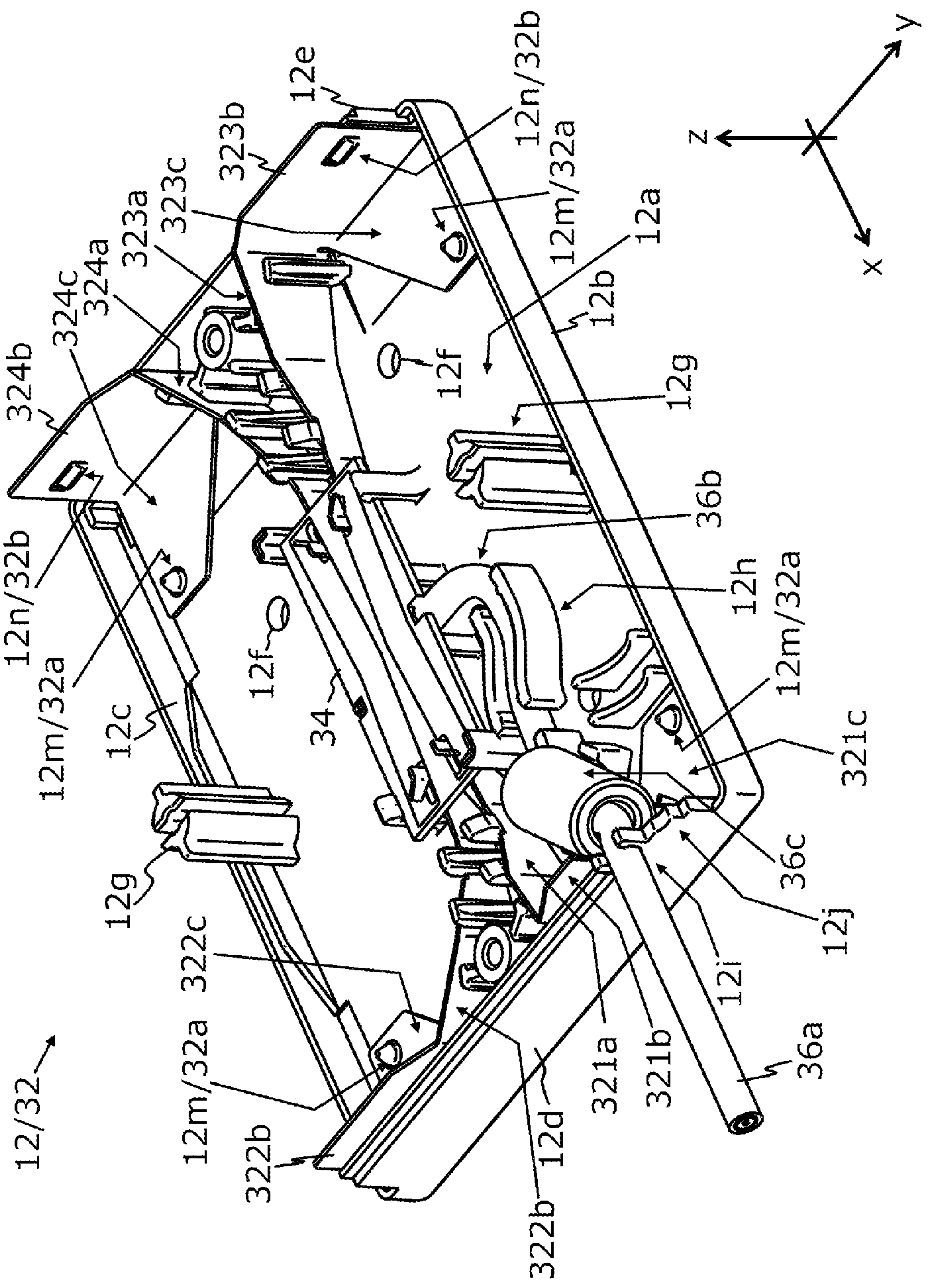
FIG. 11 is a perspective view of the second case to which the second antenna, the second substrate, and the second cable are attached as viewed from above.

As illustrated in FIG. 10 to FIG. 12, the second case 12 includes a lower surface portion 12*a*, the second left side surface portion 12*b*, the second right side surface portion 12*c*, the second front surface portion 12*d*, and the second rear surface portion 12*e*. The second case 12 holds the second antenna 32, the second substrate 34, and the second cable 36.

(Lower Surface Portion 12*a*)

The lower surface portion 12*a* forms a lower surface of the second case 12. On the upper surface of the lower surface portion 12*a*, screw holes 12*f*, the second attachment guide portion 12*g*, a second cable guide portion 12*h*, second inclined regions 12*k*, and second pins 12*m* are provided.

(Second Left Side Surface Portion 12*b*)

The second left side surface portion 12*b* extends upward in the z direction from a left end portion of the lower surface portion 12*a*, and forms a left side surface of the second case 12.

(Second Right Side Surface Portion 12*c*)

The second right side surface portion 12*c* extends upward in the z direction from a right end portion of the lower surface portion 12*a*, and forms a right side surface of the second case 12.

(Second Front Surface Portion 12*d*)

The second front surface portion 12*d* extends upward in the z direction from a front end portion of the lower surface portion 12*a*, and forms a front surface of the second case 12. The second cable holding portion 12*i* and a second holding portion receiving region 12*j* are provided at an upper left end of the second front surface portion 12*d*. Second claws 12*n* for attaching a twenty-first element 321 and a twenty-second element 322 are provided on the inner surface of the second front surface portion 12*d*. However, in order to avoid physical interference with the first cable 35 and the second cable 36, the second claw 12*n* on the left side in the y direction of the second front surface portion 12*d* may be provided below the other second claws 12*n* in the z direction. In this case, a second claw hole 32*b* of the twenty-first side portion 321*b* of the twenty-first element 321 described later is provided below the other second claw holes 32*b* in the z direction. In addition, in order to avoid physical interference with the first cable 35 and the second cable 36, the second claw 12*n* (second claw 12*n* for attaching the twenty-first element 321) on the left side in the y direction of the second front surface portion 12*d* may be omitted. In this case, the second claw hole 32*b* of the twenty-first side portion 321*b* of the twenty-first element 321 to be described later is also omitted.

(Second Rear Surface Portion 12*e*)

The second rear surface portion 12*e* extends upward in the z direction from a rear end portion of the lower surface portion 12*a*, and forms a rear surface of the second case 12. Second claws 12*n* for attaching a twenty-third element 323 and a twenty-fourth element 324 are provided on the inner surface of the second rear surface portion 12*e*.

(Dimensions of First Case 11 and Second Case 12 in z Direction)

A difference is provided in a dimension in the z direction between a surface perpendicular to the x direction (first front surface portion 11*d*, first rear surface portion 11*e*) of the first case 11 and a surface perpendicular to the y direction (first left side surface portion 11*b*, first right side surface portion 11*c*) of the first case 11. Specifically, the first left side surface portion 11*b* and the first right side surface portion 11*c* are configured to be longer in dimension in the z direction than the first front surface portion 11*d* and the first rear surface portion 11*e* (see FIG. 1 to FIG. 4). That is, the first left side surface portion 11*b* and the first right side surface portion 11*c* protrude downward in the z direction compared to the first front surface portion 11*d* and the first rear surface portion 11*e*. A difference is provided in a dimension in the z direction between a surface perpendicular to the x direction (second front surface portion 12*d*, second rear surface portion 12*e*) of the second case 12 and a surface perpendicular to the y direction (second left side surface portion 12*b*, second right side surface portion 12*c*) of the second case 12. Specifically, the second front surface portion 12*d* and the second rear surface portion 12*e* are configured to be longer in dimension in the z direction than the second left side surface portion 12*b* and the second right side surface portion 12*c* (see FIG. 1 and FIG. 10 to FIG. 12). That is, the second front surface portion 12*d* and the second rear surface portion 12*e* protrude upward in the z direction compared to the second left side surface portion 12*b* and the second right side surface portion 12*c*.

(Screw Holes 12*f*)

Screw holes 12*f* penetrate the lower surface portion 12*a* in the z direction, and are used to fix the first case 11 using the screws 13 (see FIG. 4).

(Second Attachment Guide Portion 12*g*)

The second attachment guide portion 12*g* is provided in the vicinity of the center in the x direction of the second left side surface portion 12*b* and in the vicinity of the center in the x direction of the second right side surface portion 12*c* (see FIG. 10 to FIG. 12). The second attachment guide portion 12*g* provided in the vicinity of the second left side surface portion 12*b* protrudes upward in the z direction compared to the second left side surface portion 12*b*. The second attachment guide portion 12*g* provided in the vicinity of the second left side surface portion 12*b* is fitted to the first attachment guide portion 11*g* provided in the vicinity of the first left side surface portion 11*b* of the first case 11. The second attachment guide portion 12*g* provided in the vicinity of the second right side surface portion 12*c* protrudes upward in the z direction compared to the second right side surface portion 12*c*. The second attachment guide portion 12*g* provided in the vicinity of the second right side surface portion 12*c* is fitted to the first attachment guide portion 11*g* provided in the vicinity of the first right side surface portion 11*c* of the first case 11 (see FIG. 4).

The shapes and dimensions of the first case 11 and the second case 12 are determined such that, when the first case 11 and the second case 12 are attached, the first attachment guide portion 11*g* and the second attachment guide portion 12*g* come into contact with each other earlier than other portions of the first case 11 and the second case 12.

(Second Cable Guide Portion 12*h*)

The second cable guide portion 12*h* has a wall shape protruding upward in the z direction from the upper surface of the lower surface portion 12*a* (see FIG. 10 to FIG. 12). The second cable guide portion 12*h* is provided in the vicinity of a twenty-first arm portion 321*a* of the twenty-first element 321. The second cable guide portion 12*h* has a curved shape when viewed from the z direction. The second cable guide portion 12*h* is used to bend a second distal end region 36*b* of the second cable 36 and hold and position the second distal end region 36*b* of the second cable 36 along the twenty-first arm portion 321*a* and the twenty-first side portion 321*b* of the twenty-first element 321. In addition, the second cable guide portion 12*h* bends the second distal end region 36*b* of the second cable 36 so as to avoid physical interference with the first cable 35 such as a second ferrite core 36*c* of the second cable 36 and so that the signal line at the distal end portion of the second distal end region 36*b* is parallel to the y direction.

(Second Cable Holding Portion 12*i*)

The second cable holding portion 12*i* includes a cable clip that clamps a second body portion 36*a* of the second cable 36.

(Second Holding Portion Receiving Region 12*j*)

The second holding portion receiving region 12*j* has a notch into which the first cable holding portion 11*i* of the first front surface portion 11*d* of the first case 11 is fitted.

(Positional Relationship Between Second Cable Holding Portion 12*i* and Second Holding Portion Receiving Region 12*j*)

The second holding portion receiving region 12*j* is provided at a position closer to the second left side surface portion 12*b* than the second cable holding portion 12*i*. The second cable holding portion 12*i* and the second holding portion receiving region 12*j* are adjacent in the y direction and are configured to be located at substantially the same height in the z direction.

(Positional Relationship Between First Cable Holding Portion 11*i* and Second Cable Holding Portion 12*i*)

Figure 13:
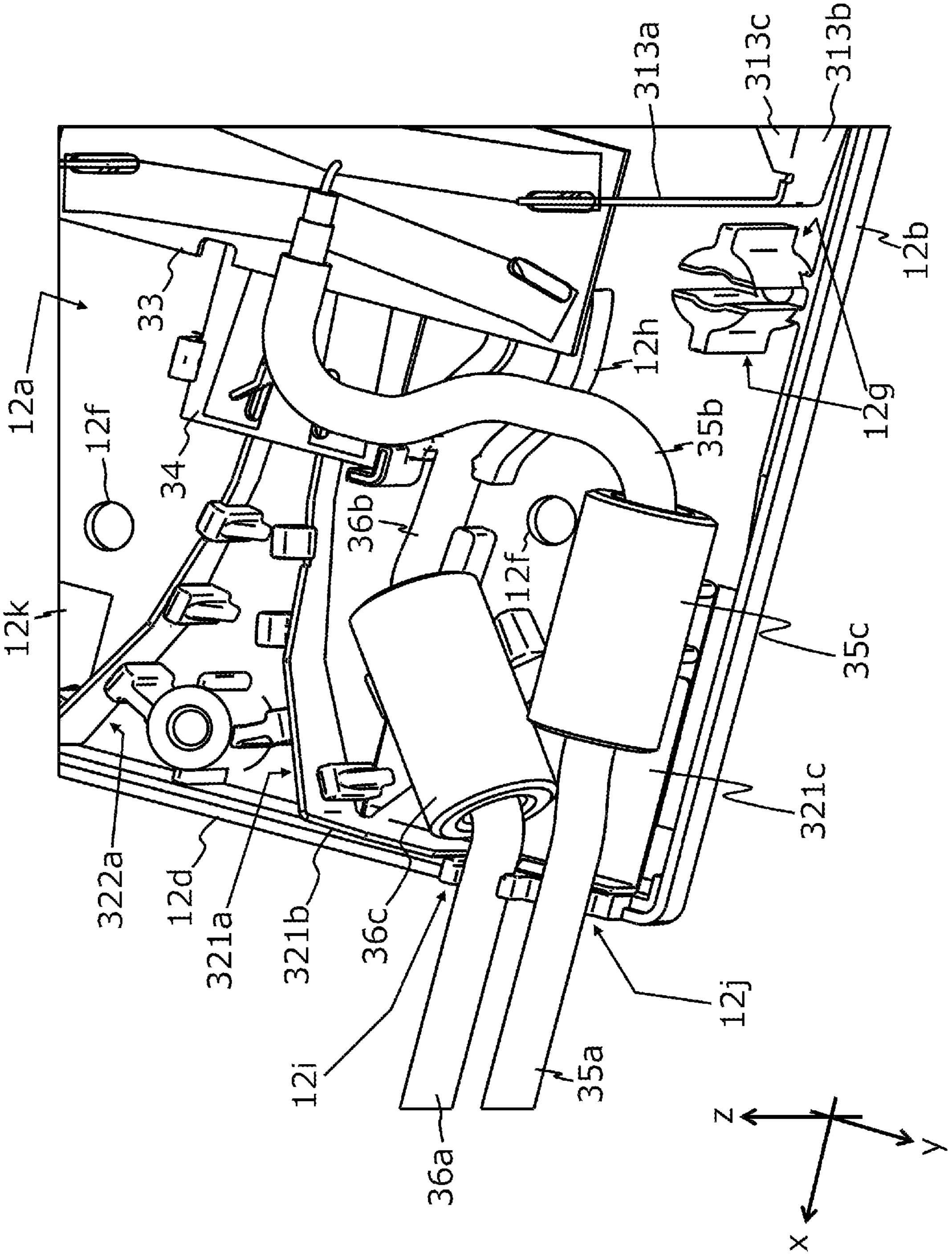
FIG. 13 is an enlarged perspective view of a region where a second cable holding portion is provided in the vehicular antenna device from which the first case, the first antenna, and the screws are removed as viewed from above.
Figure 14:
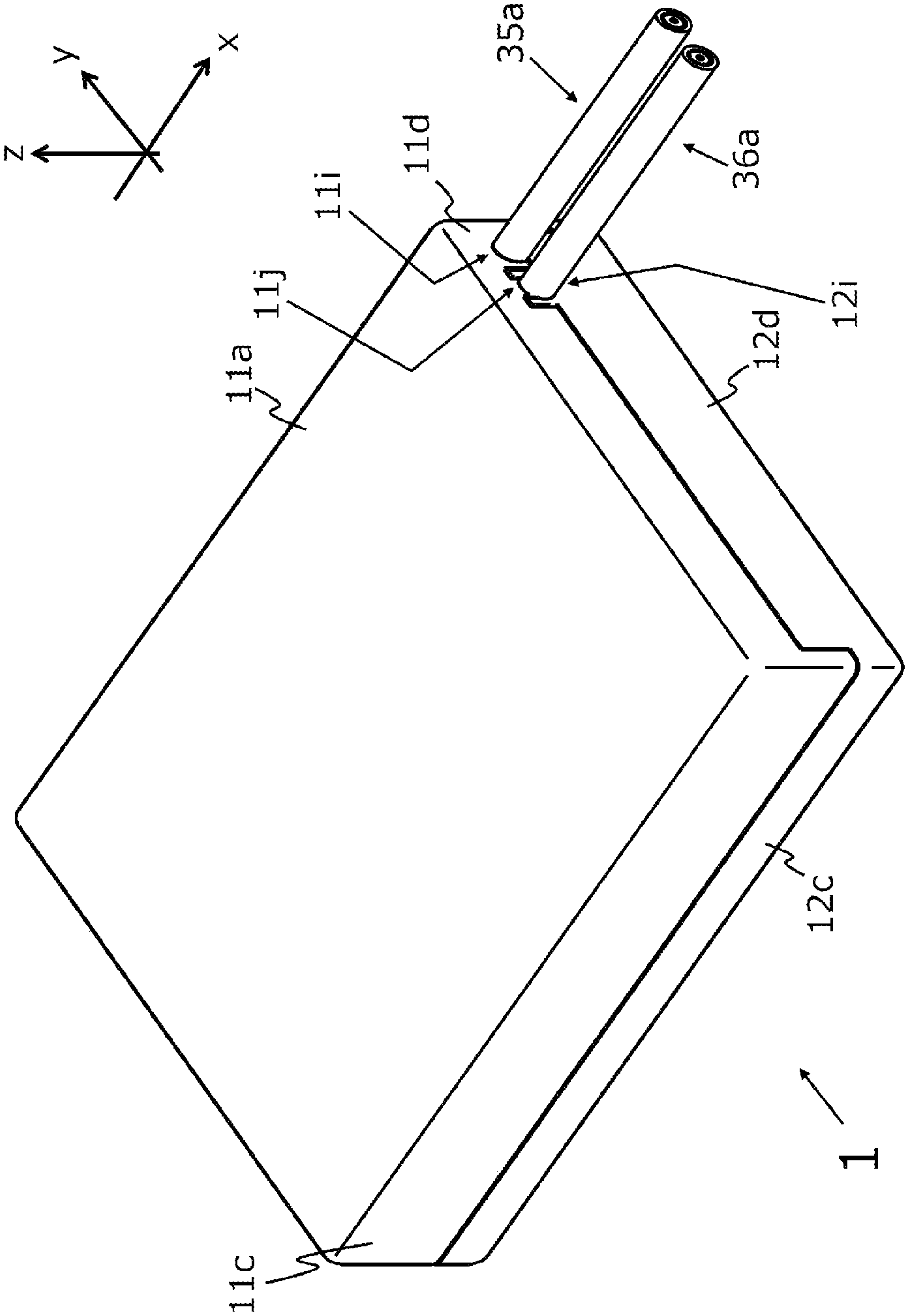
FIG. 14 is a perspective view of the vehicular antenna device as viewed from above.

As illustrated in FIG. 13 and FIG. 14, when the first case 11 and the second case 12 are attached, the dimensions of each part of the housing 10 are set such that the first cable holding portion 11*i* and the second cable holding portion 12*i* are adjacent in the y direction, that is, the heights in the z direction are substantially the same. In other words, the first cable 35 and the second cable 36 are held in a predetermined region of one surface of the housing 10.

(Definition of One Surface)

In the present embodiment, an example is shown in which the one surface is a surface including the first front surface portion 11*d* of the first case 11 and the second front surface portion 12*d* of the second case 12. However, said one surface may include another surface of the first case 11 (such as the first left side surface portion 11*b*) and another surface of the second case 12 (such as the second left side surface portion 12*b*).

(Definition of Predetermined Region)

In said predetermined region, the first cable 35 and the second cable 36 are held at a distance of a dimension smaller than the diameter of the first ferrite core 35*c* or the second ferrite core 36*c*, that is, in a state of being substantially close to each other.

Further, in said predetermined region, it is desirable that the first cable 35 and the second cable 36 be held at a distance equal to or less than the diameter of the first cable 35 or the second cable 36, that is, in a state of being substantially close to each other.

(Second Inclined Regions 12*k*)

Four second inclined regions 12*k* are provided on the upper surface of the lower surface portion 12*a* (see FIG. 10 to FIG. 12).

The second inclined region 12*k* for temporarily accommodating a twenty-first lower portion 321*c* of the twenty-first element 321 is provided on the front side of the left end portion of the upper surface of the lower surface portion 12*a*. In the second inclined region 12*k* on the front side of the left end portion of the upper surface of the lower surface portion 12*a*, an inclination (for example, an inclination such that the thickness of the lower surface portion 12*a* in the z direction becomes thin) is formed such that the recess in the z direction increases toward the second front surface portion 12*d*. The second inclined region 12*k* for temporarily accommodating a twenty-second lower portion 322*c* of the twenty-second element 322 is provided on the front side of the right end portion of the upper surface of the lower surface portion 12*a*. In the second inclined region 12*k* on the front side of the right end portion of the upper surface of the lower surface portion 12*a*, an inclination (for example, an inclination such that the thickness of the lower surface portion 12*a* in the z direction becomes thin) is formed such that the recess in the z direction increases toward the second front surface portion 12*d*.

The second inclined region 12*k* for temporarily accommodating a twenty-third lower portion 323*c* of the twenty-third element 323 is provided on the rear side of the left end portion of the upper surface of the lower surface portion 12*a*. In the second inclined region 12*k* on the rear side of the left end portion of the upper surface of the lower surface portion 12*a*, an inclination (for example, an inclination such that the thickness of the lower surface portion 12*a* in the z direction becomes thin) is formed such that the recess in the z direction increases toward the second rear surface portion 12*e*. The second inclined region 12*k* for temporarily accommodating a twenty-fourth lower portion 324*c* of the twenty-fourth element 324 is provided on the rear side of the right end portion of the upper surface of the lower surface portion 12*a*. In the second inclined region 12*k* on the rear side of the right end portion of the upper surface of the lower surface portion 12*a*, an inclination (for example, an inclination such that the thickness of the lower surface portion 12*a* in the z direction becomes thin) is formed such that the recess in the z direction increases toward the second rear surface portion 12*e*.

(Application Example of Usage of Second Inclined Region 12*k*)

In the present embodiment, an example will be described in which the second inclined region 12*k* temporarily accommodates the twenty-first lower portion 321*c* and the like, and the twenty-first lower portion 321*c* and the like are separated from the second inclined region 12*k* in a second hooking process to be described later. However, when the twenty-first lower portion 321*c* and the like are larger than a predetermined dimension due to tolerance, the second inclined region 12*k* may be used as a region for accommodating at least a part of the twenty-first lower portion 321*c* and the like even after attachment.

(Second Pins 12*m*)

Four second pins 12*m* are provided on the upper surface of the lower surface portion 12*a*. Each of the four second pins 12*m* includes a protrusion protruding upward in the z direction from the upper surface of the lower surface portion 12*a*.

In the vicinity of the second inclined region 12*k* on the front side of the left end portion of the upper surface of the lower surface portion 12*a*, the second pin 12*m* to be inserted into a second pin hole 32*a* provided in the twenty-first lower portion 321*c* of the twenty-first element 321 is provided. In the vicinity of the second inclined region 12*k* on the front side of the right end portion of the upper surface of the lower surface portion 12*a*, the second pin 12*m* to be inserted into a second pin hole 32*a* provided in the twenty-second lower portion 322*c* of the twenty-second element 322 is provided. In the vicinity of the second inclined region 12*k* on the rear side of the left end portion of the upper surface of the lower surface portion 12*a*, the second pin 12*m* to be inserted into a second pin hole 32*a* provided in the twenty-third lower portion 323*c* of the twenty-third element 323 is provided. In the vicinity of the second inclined region 12*k* on the rear side of the right end portion of the upper surface of the lower surface portion 12*a*, the second pin 12*m* to be inserted into a second pin hole 32*a* provided in the twenty-fourth lower portion 324*c* of the twenty-fourth element 324 is provided.

(Second Claws 12*n*)

Two second claws 12*n* are provided on the inner surface of the second front surface portion 12*d*, and two second claws 12*n* are provided on the inner surface of the second rear surface portion 12*e*. Each of the two second claws 12*n* provided on the second front surface portion 12*d* includes a protrusion protruding to the rear side in the x direction from the inner surface of the second front surface portion 12*d*. Each of the two second claws 12*n* provided on the second rear surface portion 12*e* includes a protrusion protruding to the front side in the x direction from the inner surface of the second rear surface portion 12*e*. In order to hook the second claw holes 32*b*, each of the four second claws 12*n* has a flat surface whose lower end is perpendicular to the z direction, or an inclined surface approaching the lower surface portion 12*a* as being separated from the inner surface.

On the left side in the y direction of the second front surface portion 12*d*, the second claw 12*n* to be inserted into the second claw hole 32*b* provided in the twenty-first side portion 321*b* of the twenty-first element 321 is provided (not illustrated). On the right side in the y direction of the second front surface portion 12*d*, the second claw 12*n* to be inserted into the second claw hole 32*b* provided in the twenty-second side portion 322*b* of the twenty-second element 322 is provided (not illustrated). On the left side in the y direction of the second rear surface portion 12*e*, the second claw 12*n* to be inserted into the second claw hole 32*b* provided in the twenty-third side portion 323*b* of the twenty-third element 323 is provided. On the right side in the y direction of the second rear surface portion 12*e*, the second claw 12*n* to be inserted into the second claw hole 32*b* provided in the twenty-fourth side portion 324*b* of the twenty-fourth element 324 is provided.

(Positional Relationship Among Second Inclined Region 12*k*, Second Pin 12*m*, and Second Claw 12*n*)

Dimensions of the second inclined region 12*k*, the second pin 12*m*, and the second claw 12*n* corresponding to one element of the second antenna 32 are determined under the following conditions. In a state where the second pin 12*m* is inserted into the second pin hole 32*a* in the lower portion of the element, said lower portion can be pushed into the second inclined region 12*k* (second pushing process). At this time, the element is bent such that the end portion of the lower portion and side portion of said element approach each other, and the angle formed by the lower portion and the side portion of said element when viewed from the y direction becomes smaller than the vertical angle. In a state where the second pin 12*m* is inserted into the second pin hole 32*a* in said lower portion and said lower portion is pushed into the second inclined region 12*k*, the second claw 12*n* can be inserted into the second claw hole 32*b* in the side portion of said element (second claw insertion process). Thereafter, the state in which said lower portion is pushed into the second inclined region 12*k* is released by pulling up said side portion. At this time, the element tries to return to the original state, and the second claw 12*n* is hooked to the second claw hole 32*b* (second hooking process). The original state referred to herein is a state in which the lower portion and the side portion of the element are substantially vertical.

(Positional Relationship Between Second Front Surface Portion 12*d* and Second Claws 12*n*)

It is desirable that the two second claws 12*n* provided on the second front surface portion 12*d* be located closer to the end portion on the upper side in the z direction of the second front surface portion 12*d*. That is, the two second claws 12*n* provided on the second front surface portion 12*d* are located in a region closer to the end portion on the upper side in the z direction of the second front surface portion 12*d* than the lower surface portion 12*a*.

(Positional Relationship Between Second Rear Surface Portion 12*e* and Second Claws 12*n*)

It is desirable that the two second claws 12*n* provided on the second rear surface portion 12*e* be located closer to the end portion on the upper side in the z direction of the second rear surface portion 12*e*. That is, the two second claws 12*n* provided on the second rear surface portion 12*e* are located in a region closer to the end portion on the upper side in the z direction of the second rear surface portion 12*e* than the lower surface portion 12*a*.

(Screws 13)

The screws 13 are used to attach the first case 11 and the second case 12 (see FIG. 1 and FIG. 10). The screws 13 are inserted into the screw holes 12*f* of the lower surface portion 12*a* of the second case 12 and screwed with the bosses 11*f* of the first case 11.

(First Antenna 31)

The first antenna 31 includes the eleventh element 311, the twelfth element 312, the thirteenth element 313, and the fourteenth element 314 (see FIG. 2 to FIG. 4).

(Eleventh Element 311)

The eleventh element 311 has the eleventh arm portion 311*a*, the eleventh side portion 311*b*, and the eleventh upper portion 311*c*. The eleventh arm portion 311*a* constitutes a proximal end region of the eleventh element 311 and has a surface perpendicular to the xy plane. The eleventh arm portion 311*a* extends from the front side of the left end portion of the first substrate 33 toward the left front direction. The proximal end portion of the eleventh side portion 311*b* is connected to the distal end portion of the eleventh arm portion 311*a* and the eleventh side portion 311*b* has a surface perpendicular to the y direction. The eleventh side portion 311*b* extends from the distal end portion of the eleventh arm portion 311*a* in the x direction and in a direction away from the thirteenth element 313. The proximal end portion of the eleventh upper portion 311*c* is connected to an upper end portion of the eleventh side portion 311*b* and the eleventh upper portion 311*c* has a surface perpendicular to the z direction. The eleventh upper portion 311*c* extends from the upper end portion of the eleventh side portion 311*b* in the y direction and in a direction approaching the twelfth element 312. The eleventh element 311 is configured such that a distal end region (region away from the first substrate 33) is wider than a proximal end region (region close to the first substrate 33).

The eleventh side portion 311*b* is provided with the first claw hole 31*b*. The eleventh upper portion 311*c* is provided with the first pin hole 31*a*.

The eleventh element 311 is attached to the upper surface portion 11*a* and the first left side surface portion 11*b* of the first case 11 in the following manner. The first pin 11*m* corresponding to the eleventh upper portion 311*c* is fitted into the first pin hole 31*a* of the eleventh upper portion 311*c*. A connection region of the eleventh upper portion 311*c* with the eleventh side portion 311*b* is pushed upward in the z direction into the first inclined region 11*k* corresponding to the eleventh upper portion 311*c* (first pushing process). Therefore, the eleventh upper portion 311*c* is temporarily in an inclined state not parallel to the xy plane. Further, the eleventh element 311 is bent such that the end portion on the right side in the y direction of the eleventh upper portion 311*c* and the end portion on the lower side in the z direction of the eleventh side portion 311*b* approach each other, and an angle formed by the eleventh upper portion 311*c* and the eleventh side portion 311*b* when viewed from the x direction becomes smaller than the vertical angle. The first claw 11*n* of the first left side surface portion 11*b* corresponding to the eleventh side portion 311*b* is fitted into the first claw hole 31*b* of the eleventh side portion 311*b* (first claw insertion process). Thereafter, by pulling down the eleventh side portion 311*b* downward in the z direction or the like, the state in which the connection region of the eleventh upper portion 311*c* with the eleventh side portion 311*b* is pushed into the first inclined region 11*k* is released. At this time, the eleventh element 311 tries to return to the original state (state in which the eleventh upper portion 311*c* and the eleventh side portion 311*b* are substantially vertical), and the first claw 11*n* is hooked to the first claw hole 31*b* (first hooking process). The upper end of the first claw hole 31*b* of the eleventh side portion 311*b* and the upper end of the first claw 11*n* of the first left side surface portion 11*b* corresponding to the eleventh side portion 311*b* come into contact with each other. That is, the eleventh element 311 becomes in a state in which the eleventh element 311 is hardly detached from the first left side surface portion 11*b*. Further, a connection region of the eleventh upper portion 311*c* with the eleventh side portion 311*b* pushed into the first inclined region 11*k* is separated from the first inclined region 11*k*. That is, the eleventh upper portion 311*c* becomes in a state in which the eleventh upper portion 311*c* is substantially parallel to the xy plane.

(Twelfth Element 312)

The twelfth element 312 has a twelfth arm portion 312*a*, the twelfth side portion 312*b*, and the twelfth upper portion 312*c*. The twelfth arm portion 312*a* constitutes a proximal end region of the twelfth element 312 and has a surface perpendicular to the xy plane. The twelfth arm portion 312*a* extends from the front side of the right end portion of the first substrate 33 toward the right front direction. The proximal end portion of the twelfth side portion 312*b* is connected to the distal end portion of the twelfth arm portion 312*a* and the twelfth side portion 312*b* has a surface perpendicular to the y direction. The twelfth side portion 312*b* extends from the distal end portion of the twelfth arm portion 312*a* in the x direction and in a direction away from the fourteenth element 314. The proximal end portion of the twelfth upper portion 312*c* is connected to an upper end portion of the twelfth side portion 312*b* and the twelfth upper portion 312*c* has a surface perpendicular to the z direction. The twelfth upper portion 312*c* extends from the upper end portion of the twelfth side portion 312*b* in the y direction and in a direction approaching the eleventh element 311. The twelfth element 312 is configured such that a distal end region (region away from the first substrate 33) is wider than a proximal end region (region close to the first substrate 33).

The twelfth side portion 312*b* is provided with the first claw hole 31*b*. The twelfth upper portion 312*c* is provided with the first pin hole 31*a*.

The twelfth element 312 is attached to the upper surface portion 11*a* and the first right side surface portion 11*c* of the first case 11 in the following manner. The first pin 11*m* corresponding to the twelfth upper portion 312*c* is fitted into the first pin hole 31*a* of the twelfth upper portion 312*c*. A connection region of the twelfth upper portion 312*c* with the twelfth side portion 312*b* is pushed upward in the z direction into the first inclined region 11*k* corresponding to the twelfth upper portion 312*c* (first pushing process). Therefore, the twelfth upper portion 312*c* is temporarily in an inclined state not parallel to the xy plane. Further, the twelfth element 312 is bent such that the end portion on the left side in the y direction of the twelfth upper portion 312*c* and the end portion on the lower side in the z direction of the twelfth side portion 312*b* approach each other, and an angle formed by the twelfth upper portion 312*c* and the twelfth side portion 312*b* when viewed from the x direction becomes smaller than the vertical angle. The first claw 11*n* of the first right side surface portion 11*c* corresponding to the twelfth side portion 312*b* is fitted into the first claw hole 31*b* of the twelfth side portion 312*b* (first claw insertion process). Thereafter, by pulling down the twelfth side portion 312*b* downward in the z direction or the like, the state in which the connection region of the twelfth upper portion 312*c* with the twelfth side portion 312*b* is pushed into the first inclined region 11*k* is released. At this time, the twelfth element 312 tries to return to the original state (state in which the twelfth upper portion 312*c* and the twelfth side portion 312*b* are substantially vertical), and the first claw 11*n* is hooked to the first claw hole 31*b* (first hooking process). The upper end of the first claw hole 31*b* of the twelfth side portion 312*b* and the upper end of the first claw 11*n* of the first right side surface portion 11*c* corresponding to the twelfth side portion 312*b* come into contact with each other. That is, the twelfth element 312 becomes in a state in which the twelfth element 312 is hardly detached from the first right side surface portion 11*c*. Further, a connection region of the twelfth upper portion 312*c* with the twelfth side portion 312*b* pushed into the first inclined region 11*k* is separated from the first inclined region 11*k*. That is, the twelfth upper portion 312*c* becomes in a state in which the twelfth upper portion 312*c* is substantially parallel to the xy plane.

(Positional Relationship Between Eleventh Element 311 and Twelfth Element 312)

The eleventh arm portion 311*a* of the eleventh element 311 and the twelfth arm portion 312*a* of the twelfth element 312 face each other in the y direction, and are bent such that the proximal end portion approaches and the distal end portion separates. When viewed from the y direction, the eleventh side portion 311*b* of the eleventh element 311 and the twelfth side portion 312*b* of the twelfth element 312 are in an overlapping positional relationship.

(Thirteenth Element 313)

The thirteenth element 313 has a thirteenth arm portion 313*a*, the thirteenth side portion 313*b*, and the thirteenth upper portion 313*c*. The thirteenth arm portion 313*a* constitutes a proximal end region of the thirteenth element 313 and has a surface perpendicular to the xy plane. The thirteenth arm portion 313*a* extends from the rear side of the left end portion of the first substrate 33 toward the left rear direction. The proximal end portion of the thirteenth side portion 313*b* is connected to the distal end portion of the thirteenth arm portion 313*a* and the thirteenth side portion 313*b* has a surface perpendicular to the y direction. The thirteenth side portion 313*b* extends from the distal end portion of the thirteenth arm portion 313*a* in the x direction and in a direction away from the eleventh element 311. The proximal end portion of the thirteenth upper portion 313*c* is connected to an upper end portion of the thirteenth side portion 313*b* and the thirteenth upper portion 313*c* has a surface perpendicular to the z direction. The thirteenth upper portion 313*c* extends from the upper end portion of the thirteenth side portion 313*b* in the y direction and in a direction approaching the fourteenth element 314. The thirteenth element 313 is configured such that a distal end region (region away from the first substrate 33) is wider than a proximal end region (region close to the first substrate 33).

The thirteenth side portion 313*b* is provided with the first claw hole 31*b*. The thirteenth upper portion 313*c* is provided with the first pin hole 31*a*.

The thirteenth element 313 is attached to the upper surface portion 11*a* and the first left side surface portion 11*b* of the first case 11 in the following manner. The first pin 11*m* corresponding to the thirteenth upper portion 313*c* is fitted into the first pin hole 31*a* of the thirteenth upper portion 313*c*. A connection region of the thirteenth upper portion 313*c* with the thirteenth side portion 313*b* is pushed upward in the z direction into the first inclined region 11*k* corresponding to the thirteenth upper portion 313*c* (first pushing process). Therefore, the thirteenth upper portion 313*c* is temporarily in an inclined state not parallel to the xy plane. Further, the thirteenth element 313 is bent such that the end portion on the right side in the y direction of the thirteenth upper portion 313*c* and the end portion on the lower side in the z direction of the thirteenth side portion 313*b* approach each other, and an angle formed by the thirteenth upper portion 313*c* and the thirteenth side portion 313*b* when viewed from the x direction becomes smaller than the vertical angle. The first claw 11*n* of the first left side surface portion 11*b* corresponding to the thirteenth side portion 313*b* is fitted into the first claw hole 31*b* of the thirteenth side portion 313*b* (first claw insertion process). Thereafter, by pulling down the thirteenth side portion 313*b* downward in the z direction or the like, the state in which the connection region of the thirteenth upper portion 313*c* with the thirteenth side portion 313*b* is pushed into the first inclined region 11*k* is released. At this time, the thirteenth element 313 tries to return to the original state (state in which the thirteenth upper portion 313*c* and the thirteenth side portion 313*b* are substantially vertical), and the first claw 11*n* is hooked to the first claw hole 31*b* (first hooking process). The upper end of the first claw hole 31*b* of the thirteenth side portion 313*b* and the upper end of the first claw 11*n* of the first left side surface portion 11*b* corresponding to the thirteenth side portion 313*b* come into contact with each other. That is, the thirteenth element 313 becomes in a state in which the thirteenth element 313 is hardly detached from the first left side surface portion 11*b*. Further, a connection region of the thirteenth upper portion 313*c* with the thirteenth side portion 313*b* pushed into the first inclined region 11*k* is separated from the first inclined region 11*k*. That is, the thirteenth upper portion 313*c* becomes in a state in which the thirteenth upper portion 313*c* is substantially parallel to the xy plane.

(Fourteenth Element 314)

The fourteenth element 314 has a fourteenth arm portion 314*a*, the fourteenth side portion 314*b*, and the fourteenth upper portion 314*c*. The fourteenth arm portion 314*a* constitutes a proximal end region of the fourteenth element 314 and has a surface perpendicular to the xy plane. The fourteenth arm portion 314*a* extends from the rear side of the right end portion of the first substrate 33 toward the right rear direction. The proximal end portion of the fourteenth side portion 314*b* is connected to the distal end portion of the fourteenth arm portion 314*a* and the fourteenth side portion 314*b* has a surface perpendicular to the y direction. The fourteenth side portion 314*b* extends from the distal end portion of the fourteenth arm portion 314*a* in the x direction and in a direction away from the twelfth element 312. The proximal end portion of the fourteenth upper portion 314*c* is connected to an upper end portion of the fourteenth side portion 314*b* and the fourteenth upper portion 314*c* has a surface perpendicular to the z direction. The fourteenth upper portion 314*c* extends from the upper end portion of the fourteenth side portion 314*b* in the y direction and in a direction approaching the thirteenth element 313. The fourteenth element 314 is configured such that a distal end region (region away from the first substrate 33) is wider than a proximal end region (region close to the first substrate 33).

The fourteenth side portion 314*b* is provided with the first claw hole 31*b*. The fourteenth upper portion 314*c* is provided with the first pin hole 31*a*.

The fourteenth element 314 is attached to the upper surface portion 11*a* and the first right side surface portion 11*c* of the first case 11 in the following manner. The first pin 11*m* corresponding to the fourteenth upper portion 314*c* is fitted into the first pin hole 31*a* of the fourteenth upper portion 314*c*. A connection region of the fourteenth upper portion 314*c* with the fourteenth side portion 314*b* is pushed upward in the z direction into the first inclined region 11*k* corresponding to the fourteenth upper portion 314*c* (first pushing process, see FIG. 6). Therefore, the fourteenth upper portion 314*c* is temporarily in an inclined state not parallel to the xy plane. Further, the fourteenth element 314 is bent such that the end portion on the left side in the y direction of the fourteenth upper portion 314*c* and the end portion on the lower side in the z direction of the fourteenth side portion 314*b* approach each other, and an angle formed by the fourteenth upper portion 314*c* and the fourteenth side portion 314*b* when viewed from the x direction becomes smaller than the vertical angle. The first claw 11*n* of the first right side surface portion 11*c* corresponding to the fourteenth side portion 314*b* is fitted into the first claw hole 31*b* of the fourteenth side portion 314*b* (first claw insertion process, see FIG. 7). Thereafter, by pulling down the fourteenth side portion 314*b* downward in the z direction or the like, the state in which the connection region of the fourteenth upper portion 314*c* with the fourteenth side portion 314*b* is pushed into the first inclined region 11*k* is released. At this time, the fourteenth element 314 tries to return to the original state (state in which the fourteenth upper portion 314*c* and the fourteenth side portion 314*b* are substantially vertical), and the first claw 11*n* is hooked to the first claw hole 31*b* (first hooking process, see FIG. 8). The upper end of the first claw hole 31*b* of the fourteenth side portion 314*b* and the upper end of the first claw 11*n* of the first right side surface portion 11*c* corresponding to the fourteenth side portion 314*b* come into contact with each other. That is, the fourteenth element 314 becomes in a state in which the fourteenth element 314 is hardly detached from the first right side surface portion 11*c*. Further, a connection region of the fourteenth upper portion 314*c* with the fourteenth side portion 314*b* pushed into the first inclined region 11*k* is separated from the first inclined region 11*k*. That is, the fourteenth upper portion 314*c* becomes in a state in which the fourteenth upper portion 314*c* is substantially parallel to the xy plane (see FIG. 9).

(Positional Relationship Between Thirteenth Element 313 and Fourteenth Element 314)

The thirteenth arm portion 313*a* of the thirteenth element 313 and the fourteenth arm portion 314*a* of the fourteenth element 314 face each other in the y direction, and are bent such that the proximal end portion approaches and the distal end portion separates (see FIG. 2 to FIG. 4). When viewed from the y direction, the thirteenth side portion 313*b* of the thirteenth element 313 and the fourteenth side portion 314*b* of the fourteenth element 314 are in an overlapping positional relationship.

(Second Antenna 32)

The second antenna 32 includes the twenty-first element 321, the twenty-second element 322, the twenty-third element 323, and the twenty-fourth element 324 (see FIG. 10 to FIG. 12).

(Twenty-First Element 321)

The twenty-first element 321 has the twenty-first arm portion 321*a*, the twenty-first side portion 321*b*, and the twenty-first lower portion 321*c*. The twenty-first arm portion 321*a* constitutes a proximal end region of the twenty-first element 321 and has a surface perpendicular to the xy plane. The twenty-first arm portion 321*a* extends from the left side of the front end portion of the second substrate 34 toward the left front direction. The proximal end portion of the twenty-first side portion 321*b* is connected to the distal end portion of the twenty-first arm portion 321*a* and the twenty-first side portion 312*b* has a surface perpendicular to the x direction. The twenty-first side portion 321*b* extends from the distal end portion of the twenty-first arm portion 321*a* in the y direction and in a direction away from the twenty-second element 322. The proximal end portion of the twenty-first lower portion 321*c* is connected to the lower end portion of the twenty-first side portion 321*b* and the twenty-first lower portion 312*c* has a surface perpendicular to the z direction. The twenty-first lower portion 321*c* extends from the lower end portion of the twenty-first side portion 321*b* in the x direction and in a direction approaching the twenty-third element 323. The twenty-first element 321 is configured such that a distal end region (region away from the second substrate 34) is wider than a proximal end region (region close to the second substrate 34).

The twenty-first side portion 321*b* is provided with the second claw hole 32*b*. The twenty-first lower portion 321*c* is provided with the second pin hole 32*a*.

The twenty-first element 321 is attached to the lower surface portion 12*a* and the second front surface portion 12*d* of the second case 12 in the following manner. The second pin 12*m* corresponding to the twenty-first lower portion 321*c* is fitted into the second pin hole 32*a* of the twenty-first lower portion 321*c*. A connection region of the twenty-first lower portion 321*c* with the twenty-first side portion 321*b* is pushed downward in the z direction into the second inclined region 12*k* corresponding to the twenty-first lower portion 321*c*. Therefore, the twenty-first lower portion 321*c* is temporarily in an inclined state not parallel to the xy plane. Further, the twenty-first element 321 is bent such that the end portion on the rear side in the x direction of the twenty-first lower portion 321*c* and the end portion on the upper side in the z direction of the twenty-first side portion 321*b* approach each other, and an angle formed by the twenty-first lower portion 321*c* and the twenty-first side portion 321*b* when viewed from the y direction becomes smaller than the vertical angle. The second claw 12*n* of the second front surface portion 12*d* corresponding to the twenty-first side portion 321*b* is fitted into the second claw hole 32*b* of the twenty-first side portion 321*b*. Thereafter, by pulling up the twenty-first side portion 321*b* upward in the z direction or the like, the state in which the connection region of the twenty-first lower portion 321*c* with the twenty-first side portion 321*b* is pushed into the second inclined region 12*k* is released. At this time, the twenty-first element 321 tries to return to the original state (state in which the twenty-first lower portion 321*c* and the twenty-first side portion 321*b* are substantially vertical), and the second claw 12*n* is hooked to the second claw hole 32*b*. The lower end of the second claw hole 32*b* of the twenty-first side portion 321*b* and the lower end of the second claw 12*n* of the second front surface portion 12*d* corresponding to the twenty-first side portion 321*b* come into contact with each other. That is, the twenty-first element 321 becomes in a state in which the twenty-first element 321 is hardly detached from the second front surface portion 12*d*. Further, a connection region of the twenty-first lower portion 321*c* with the twenty-first side portion 321*b* pushed into the second inclined region 12*k* is separated from the second inclined region 12*k*. That is, the twenty-first lower portion 321*c* becomes in a state in which the twenty-first lower portion 321*c* is substantially parallel to the xy plane.

(Positional Relationship Between Eleventh Element 311 and Twenty-First Element 321)

Figure 15:
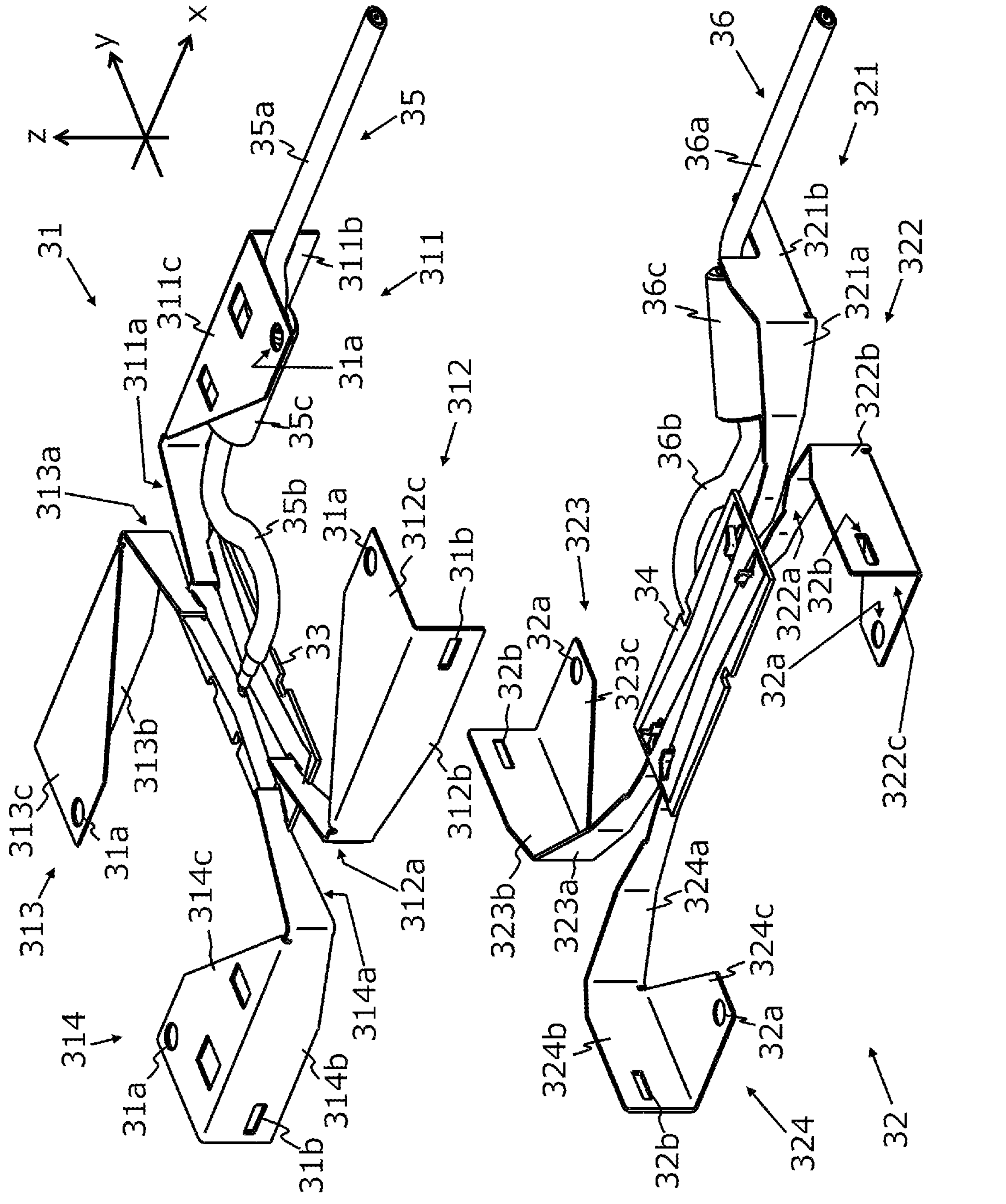
FIG. 15 is a perspective view of the assembly of the first antenna, the first substrate, and the first cable, and the assembly of the second antenna, the second substrate, and the second cable as viewed from above.

As illustrated in FIG. 15, when viewed from the z direction, the eleventh upper portion 311*c* of the eleventh element 311 and the twenty-first lower portion 321*c* of the twenty-first element 321 are in a positional relationship in which at least a part (distal end portion) overlaps. Further, when viewed from the z direction, the eleventh side portion 311*b* of the eleventh element 311 and the twenty-first side portion 321*b* of the twenty-first element 321 are in a positional relationship of not overlapping each other.

(Twenty-Second Element 322)

The twenty-second element 322 has a twenty-second arm portion 322*a*, the twenty-second side portion 322*b*, and the twenty-second lower portion 322*c* (see FIG. 10 to FIG. 12). The twenty-second arm portion 322*a* constitutes a proximal end region of the twenty-second element 322 and has a surface perpendicular to the xy plane. The twenty-second arm portion 322*a* extends from the right side of the front end portion of the second substrate 34 toward the right front direction. The proximal end portion of the twenty-second side portion 322*b* is connected to the distal end portion of the twenty-second arm portion 322*a* and the twenty-second side portion 322*b* has a surface perpendicular to the x direction. The twenty-second side portion 322*b* extends from the distal end portion of the twenty-second arm portion 322*a* in the y direction and in a direction away from the twenty-first element 321. The proximal end portion of the twenty-second lower portion 322*c* is connected to the lower end portion of the twenty-second side portion 322*b* and the twenty-second lower portion 322*c* has a surface perpendicular to the z direction. The twenty-second lower portion 322*c* extends from the lower end portion of the twenty-second side portion 322*b* in the x direction and in a direction approaching the twenty-fourth element 324. The twenty-second element 322 is configured such that a distal end region (region away from the second substrate 34) is wider than a proximal end region (region close to the second substrate 34).

The twenty-second side portion 322*b* is provided with the second claw hole 32*b*. The twenty-second lower portion 322*c* is provided with the second pin hole 32*a*.

The twenty-second element 322 is attached to the lower surface portion 12*a* and the second front surface portion 12*d* of the second case 12 in the following manner. The second pin 12*m* corresponding to the twenty-second lower portion 322*c* is fitted into the second pin hole 32*a* of the twenty-second lower portion 322*c*. A connection region of the twenty-second lower portion 322*c* with the twenty-second side portion 322*b* is pushed downward in the z direction into the second inclined region 12*k* corresponding to the twenty-second lower portion 322*c*. Therefore, the twenty-second lower portion 322*c* is temporarily in an inclined state not parallel to the xy plane. Further, the twenty-second element 322 is bent such that the end portion on the rear side in the x direction of the twenty-second lower portion 322*c* and the end portion on the upper side in the z direction of the twenty-second side portion 322*b* approach each other, and an angle formed by the twenty-second lower portion 322*c* and the twenty-second side portion 322*b* when viewed from the y direction becomes smaller than the vertical angle. The second claw 12*n* of the second front surface portion 12*d* corresponding to the twenty-second side portion 322*b* is fitted into the second claw hole 32*b* of the twenty-second side portion 322*b*. Thereafter, by pulling up the twenty-second side portion 322*b* upward in the z direction or the like, the state in which the connection region of the twenty-second lower portion 322*c* with the twenty-second side portion 322*b* is pushed into the second inclined region 12*k* is released. At this time, the twenty-second element 322 tries to return to the original state (state in which the twenty-second lower portion 322*c* and the twenty-second side portion 322*b* are substantially vertical), and the second claw 12*n* is hooked to the second claw hole 32*b*. The lower end of the second claw hole 32*b* of the twenty-second side portion 322*b* and the lower end of the second claw 12*n* of the second front surface portion 12*d* corresponding to the twenty-second side portion 322*b* come into contact with each other. That is, the twenty-second element 322 becomes in a state in which the twenty-second element 322 is hardly detached from the second front surface portion 12*d*. Further, a connection region of the twenty-second lower portion 322*c* with the twenty-second side portion 322*b* pushed into the second inclined region 12*k* is separated from the second inclined region 12*k*. That is, the twenty-second lower portion 322*c* becomes in a state in which the twenty-second lower portion 322*c* is substantially parallel to the xy plane.

(Positional Relationship Between Twelfth Element 312 and Twenty-Second Element 322)

When viewed from the z direction, the twelfth upper portion 312*c* of the twelfth element 312 and the twenty-second lower portion 322*c* of the twenty-second element 322 are in a positional relationship in which at least a part (distal end portion) overlaps (see FIG. 15). Further, when viewed from the z direction, the twelfth side portion 312*b* of the twelfth element 312 and the twenty-second side portion 322*b* of the twenty-second element 322 are in a positional relationship of not overlapping each other.

(Positional Relationship Between Twenty-First Element 321 and Twenty-Second Element 322)

The twenty-first arm portion 321*a* of the twenty-first element 321 and the twenty-second arm portion 322*a* of the twenty-second element 322 face each other in the y direction, and are bent such that the proximal end portion approaches and the distal end portion separates (see FIG. 10 to FIG. 12).

(Twenty-Third Element 323)

The twenty-third element 323 has a twenty-third arm portion 323*a*, the twenty-third side portion 323*b*, and the twenty-third lower portion 323*c*. The twenty-third arm portion 323*a* constitutes a proximal end region of the twenty-third element 323 and has a surface perpendicular to the xy plane. The twenty-third arm portion 323*a* extends from the left side of the rear end portion of the second substrate 34 toward the left rear direction. The proximal end portion of the twenty-third side portion 323*b* is connected to the distal end portion of the twenty-third arm portion 323*a* and the twenty-third side portion 323*b* has a surface perpendicular to the x direction. The twenty-third side portion 323*b* extends from the distal end portion of the twenty-third arm portion 323*a* in the y direction and in a direction away from the twenty-fourth element 324. The proximal end portion of the twenty-third lower portion 323*c* is connected to the lower end portion of the twenty-third side portion 323*b* and the twenty-third power portion 323*c* has a surface perpendicular to the z direction. The twenty-third lower portion 323*c* extends from the lower end portion of the twenty-third side portion 323*b* in the x direction and in a direction approaching the twenty-first element 321. The twenty-third element 323 is configured such that a distal end region (region away from the second substrate 34) is wider than a proximal end region (region close to the second substrate 34).

The twenty-third side portion 323*b* is provided with the second claw hole 32*b*. The twenty-third lower portion 323*c* is provided with the second pin hole 32*a*.

The twenty-third element 323 is attached to the lower surface portion 12*a* and the second rear surface portion 12*e* of the second case 12 in the following manner. The second pin 12*m* corresponding to the twenty-third lower portion 323*c* is fitted into the second pin hole 32*a* of the twenty-third lower portion 323*c*. A connection region of the twenty-third lower portion 323*c* with the twenty-third side portion 323*b* is pushed downward in the z direction into the second inclined region 12*k* corresponding to the twenty-third lower portion 323*c*. Therefore, the twenty-third lower portion 323*c* is temporarily in an inclined state not parallel to the xy plane. Further, the twenty-third element 323 is bent such that the end portion on the front side in the x direction of the twenty-third lower portion 323*c* and the end portion on the upper side in the z direction of the twenty-third side portion 323*b* approach each other, and an angle formed by the twenty-third lower portion 323*c* and the twenty-third side portion 323*b* when viewed from the y direction becomes smaller than the vertical angle. The second claw 12*n* of the second rear surface portion 12*e* corresponding to the twenty-third side portion 323*b* is fitted into the second claw hole 32*b* of the twenty-third side portion 323*b*. Thereafter, by pulling up the twenty-third side portion 323*b* upward in the z direction or the like, the state in which the connection region of the twenty-third lower portion 323*c* with the twenty-third side portion 323*b* is pushed into the second inclined region 12*k* is released. At this time, the twenty-third element 323 tries to return to the original state (state in which the twenty-third lower portion 323*c* and the twenty-third side portion 323*b* are substantially vertical), and the second claw 12*n* is hooked to the second claw hole 32*b*. The lower end of the second claw hole 32*b* of the twenty-third side portion 323*b* and the lower end of the second claw 12*n* of the second rear surface portion 12*e* corresponding to the twenty-third side portion 323*b* come into contact with each other. That is, the twenty-third element 323 becomes in a state in which the twenty-third element 323 is hardly detached from the second rear surface portion 12*e*. Further, a connection region of the twenty-third lower portion 323*c* with the twenty-third side portion 323*b* pushed into the second inclined region 12*k* is separated from the second inclined region 12*k*. That is, the twenty-third lower portion 323*c* becomes in a state in which the twenty-third lower portion 323*c* is substantially parallel to the xy plane.

(Positional Relationship Between Thirteenth Element 313 and Twenty-Third Element 323)

When viewed from the z direction, the thirteenth upper portion 313*c* of the thirteenth element 313 and the twenty-third lower portion 323*c* of the twenty-third element 323 are in a positional relationship in which at least a part (distal end portion) overlaps (see FIG. 15). Further, when viewed from the z direction, the thirteenth side portion 313*b* of the thirteenth element 313 and the twenty-third side portion 323*b* of the twenty-third element 323 are in a positional relationship of not overlapping each other.

(Positional Relationship Between Twenty-First Element 321 and Twenty-Third Element 323)

When viewed from the x direction, the twenty-first side portion 321*b* of the twenty-first element 321 and the twenty-third side portion 323*b* of the twenty-third element 323 are in an overlapping positional relationship (see FIG. 10 to FIG. 12).

(Twenty-Fourth Element 324)

The twenty-fourth element 324 has a twenty-fourth arm portion 324*a*, the twenty-fourth side portion 324*b*, and the twenty-fourth lower portion 324*c*. The twenty-fourth arm portion 324*a* constitutes a proximal end region of the twenty-fourth element 324 and has a surface perpendicular to the xy plane. The twenty-fourth arm portion 324*a* extends from the right side of the rear end portion of the second substrate 34 toward the right rear direction. The proximal end portion of the twenty-fourth side portion 324*b* is connected to the distal end portion of the twenty-fourth arm portion 324*a* and the twenty-fourth side portion 324*b* has a surface perpendicular to the x direction. The twenty-fourth side portion 324*b* extends from the distal end portion of the twenty-fourth arm portion 324*a* in the y direction and in a direction away from the twenty-third element 323. The proximal end portion of the twenty-fourth lower portion 324*c* is connected to the lower end portion of the twenty-fourth side portion 324*b* and the twenty-fourth lower portion 324*c* has a surface perpendicular to the z direction. The twenty-fourth lower portion 324*c* extends from the lower end portion of the twenty-fourth side portion 324*b* in the x direction and in a direction approaching the twenty-second element 322. The twenty-fourth element 324 is configured such that a distal end region (region away from the second substrate 34) is wider than a proximal end region (region close to the second substrate 34).

The twenty-fourth side portion 324*b* is provided with the second claw hole 32*b*. The twenty-fourth lower portion 324*c* is provided with the second pin hole 32*a*.

The twenty-fourth element 324 is attached to the lower surface portion 12*a* and the second rear surface portion 12*e* of the second case 12 in the following manner. The second pin 12*m* corresponding to the twenty-fourth lower portion 324*c* is fitted into the second pin hole 32*a* of the twenty-fourth lower portion 324*c*. A connection region of the twenty-fourth lower portion 324*c* with the twenty-fourth side portion 324*b* is pushed downward in the z direction into the second inclined region 12*k* corresponding to the twenty-fourth lower portion 324*c*. Therefore, the twenty-fourth lower portion 324*c* is temporarily in an inclined state not parallel to the xy plane. Further, the twenty-fourth element 324 is bent such that the end portion on the front side in the x direction of the twenty-fourth lower portion 324*c* and the end portion on the upper side in the z direction of the twenty-fourth side portion 324*b* approach each other, and an angle formed by the twenty-fourth lower portion 324*c* and the twenty-fourth side portion 324*b* when viewed from the y direction becomes smaller than the vertical angle. The second claw 12*n* of the second rear surface portion 12*e* corresponding to the twenty-fourth side portion 324*b* is fitted into the second claw hole 32*b* of the twenty-fourth side portion 324*b*. Thereafter, by pulling up the twenty-fourth side portion 324*b* upward in the z direction or the like, the state in which the connection region of the twenty-fourth lower portion 324*c* with the twenty-fourth side portion 324*b* is pushed into the second inclined region 12*k* is released. At this time, the twenty-fourth element 324 tries to return to the original state (state in which the twenty-fourth lower portion 324*c* and the twenty-fourth side portion 324*b* are substantially vertical), and the second claw 12*n* is hooked to the second claw hole 32*b*. The lower end of the second claw hole 32*b* of the twenty-fourth side portion 324*b* and the lower end of the second claw 12*n* of the second rear surface portion 12*e* corresponding to the twenty-fourth side portion 324*b* come into contact with each other. That is, the twenty-fourth element 324 becomes in a state in which the twenty-fourth element 324 is hardly detached from the second rear surface portion 12*e*. Further, a connection region of the twenty-fourth lower portion 324*c* with the twenty-fourth side portion 324*b* pushed into the second inclined region 12*k* is separated from the second inclined region 12*k*. That is, the twenty-fourth lower portion 324*c* becomes in a state in which the twenty-fourth lower portion 324*c* is substantially parallel to the xy plane.

(Positional Relationship Between Fourteenth Element 314 and Twenty-Fourth Element 324)

When viewed from the z direction, the fourteenth upper portion 314*c* of the fourteenth element 314 and the twenty-fourth lower portion 324*c* of the twenty-fourth element 324 are in a positional relationship in which at least a part (distal end portion) overlaps (see FIG. 15). Further, when viewed from the z direction, the fourteenth side portion 314*b* of the fourteenth element 314 and the twenty-fourth side portion 324*b* of the twenty-fourth element 324 are in a positional relationship of not overlapping each other.

(Positional Relationship Between Twenty-Second Element 322 and Twenty-Fourth Element 324)

When viewed from the x direction, the twenty-second side portion 322*b* of the twenty-second element 322 and the twenty-fourth side portion 324*b* of the twenty-fourth element 324 are in an overlapping positional relationship (see FIG. 10 to FIG. 12).

(Positional Relationship Between Twenty-Third Element 323 and Twenty-Fourth Element 324)

The twenty-third arm portion 323*a* of the twenty-third element 323 and the twenty-fourth arm portion 324*a* of the twenty-fourth element 324 face each other in the y direction, and are bent such that the proximal end portion approaches and the distal end portion separates.

(First Substrate 33)

The first substrate 33 includes a circuit of the first antenna 31 (see FIG. 12 and FIG. 15).

The first substrate 33 has a substantially rectangular outer shape whose length in the y direction is longer than the length in the x direction when viewed from the z direction. The eleventh arm portion 311*a* of the eleventh element 311 is attached to the front side of the left end portion of the first substrate 33. The twelfth arm portion 312*a* of the twelfth element 312 is attached to the front side of the right end portion of the first substrate 33. The thirteenth arm portion 313*a* of the thirteenth element 313 is attached to the rear side of the left end portion of the first substrate 33. The fourteenth arm portion 314*a* of the fourteenth element 314 is attached to the rear side of the right end portion of the first substrate 33. The tip of the first distal end region 35*b* of the first cable 35 is attached to the front-rear center and the left-right center of the first substrate 33. The eleventh element 311, the twelfth element 312, the thirteenth element 313, and the fourteenth element 314 are electrically connected to the first cable 35 via the first substrate 33. One of the signal line and the ground line of the first cable 35 is electrically connected to the eleventh element 311 and the twelfth element 312 via the first substrate 33. The other of the signal line and the ground line of the first cable 35 is electrically connected to the thirteenth element 313 and the fourteenth element 314 via the first substrate 33.

(Second Substrate 34)

The second substrate 34 includes a circuit of the second antenna 32. The second substrate 34 has a substantially rectangular outer shape whose length in the x direction is longer than the length in the y direction when viewed from the z direction. The twenty-first arm portion 321*a* of the twenty-first element 321 is attached to the left side of the front end portion of the second substrate 34. The twenty-second arm portion 322*a* of the twenty-second element 322 is attached to the right side of the front end portion of the second substrate 34. The twenty-third arm portion 323*a* of the twenty-third element 323 is attached to the left side of the rear end portion of the second substrate 34. The twenty-fourth arm portion 324*a* of the twenty-fourth element 324 is attached to the right side of the rear end portion of the second substrate 34. The tip of the second distal end region 36*b* of the second cable 36 is attached to the front-rear center and the left-right center of the second substrate 34. The twenty-first element 321, the twenty-second element 322, the twenty-third element 323, and the twenty-fourth element 324 are electrically connected to the second cable 36 via the second substrate 24. One of the signal line and the ground line of the second cable 36 is electrically connected to the twenty-first element 321 and the twenty-third element 323 via the second substrate 34. The other of the signal line and the ground line of the second cable 36 is electrically connected to the twenty-second element 322 and the twenty-fourth element 324 via the second substrate 34.

(Positional Relationship Between First Substrate 33 and Second Substrate 34)

The first substrate 33 is located above the second substrate 34 in the z direction. When viewed from the z direction, the front-rear center and the left-right center of the first substrate 33 is in a positional relationship of substantially overlapping the front-rear center and the left-right center of the second substrate 34. When viewed from the z direction, the first substrate 33 and the second substrate 34 have a substantially cross-shaped outer shape.

(First Cable 35)

The first cable 35 is a cable for the first antenna 31. The first cable 35 includes the first body portion 35*a*, the first distal end region 35*b*, and a first ferrite core 35*c* (see FIG. 2 to FIG. 5 and FIG. 12 to FIG. 15). The first body portion 35*a* is used for connection between the first antenna 31 and an electric device of a vehicle to which the vehicular antenna device 1 is attached. The first body portion 35*a* is clamped by the first cable holding portion 11*i* of the first front surface portion 11*d* of the first case 11. A distal end region (first distal end region 35*b*) of the first body portion 35*a* on a side close to the first substrate 33 is connected to the first substrate 33 in a state of being bent in a substantially S shape. A part of the first distal end region 35*b* is clamped by the first cable guide portion 11*h* of the upper surface portion 11*a* of the first case 11 so that the signal line at the distal end portion of the first distal end region 35*b* is parallel to the x direction. The first ferrite core (noise removal filter) 35*c* is provided between the first body portion 35*a* and the first distal end region 35*b*. Inside the first case 11, the first cable 35 is disposed along the eleventh element 311. Specifically, the portion of the first body portion 35*a* close to the first ferrite core 35*c* and the first ferrite core 35*c* are disposed in the vicinity of the connection region of the eleventh side portion 311*b* with the eleventh upper portion 311*c*. The first distal end region 35*b* is arranged in the vicinity of the eleventh arm portion 311*a*.

(Positional Relationship Among First Antenna 31, First Substrate 33, and First Cable 35)

The eleventh arm portion 311*a*, the twelfth arm portion 312*a*, the thirteenth arm portion 313*a*, and the fourteenth arm portion 314*a* of the first antenna 31, and the first distal end region 35*b* of the first cable 35 are located above the first substrate 33 in the z direction. However, the fold pieces of the eleventh arm portion 311*a*, the twelfth arm portion 312*a*, the thirteenth arm portion 313*a*, and the fourteenth arm portion 314*a* to be attached to the first substrate 33 are located below the first substrate 33 in the z direction.

(Second Cable 36)

The second cable 36 is a cable for the second antenna 32. The second cable 36 includes the second body portion 36*a*, the second distal end region 36*b*, and the second ferrite core 36*c* (see FIG. 4 and FIG. 10 to FIG. 15). The second body portion 36*a* is used for connection between the second antenna 32 and an electrical device of the vehicle to which the vehicular antenna device 1 is attached. The second body portion 36*a* is clamped by the second cable holding portion 12*i* of the second front surface portion 12*d* of the second case 12. A distal end region (second distal end region 36*b*) of the second body portion 36*a* on a side close to the second substrate 34 is connected to the second substrate 34 in a state of being bent in a substantially S shape. A part of the second distal end region 36*b* is clamped by the second cable guide portion 12*h* of the lower surface portion 12*a* of the second case 12 so that the signal line at the distal end portion of the second distal end region 36*b* is parallel to the y direction. The second ferrite core (noise removal filter) 36*c* is provided between the second body portion 36*a* and the second distal end region 36*b*. Inside the second case 12, the second cable 36 is disposed along the twenty-first element 321. Specifically, the second ferrite core 36*c* and the second distal end region 36*b* are arranged in the vicinity of the twenty-first arm portion 321*a*.

(Positional Relationship Among Second Antenna 32, Second Substrate 34, and Second Cable 36)

The twenty-first arm portion 321*a*, the twenty-second arm portion 322*a*, the twenty-third arm portion 323*a*, the twenty-fourth arm portion 324*a* of the second antenna 32, and the second distal end region 36*b* of the second cable 36 are located below the second substrate 34 in the z direction. However, the fold pieces of the twenty-first arm portion 321*a*, the twenty-second arm portion 322*a*, the twenty-third arm portion 323*a*, and the twenty-fourth arm portion 324*a* to be attached to the second substrate 34 are located above the second substrate 34 in the z direction.

(Positional Relationship Among First Antenna 31, First Cable 35, Second Antenna 32, and Second Cable 36)

A member (part of the first body portion 35*a*, the first distal end region 35*b*, and the first ferrite core 35*c*) disposed inside the housing 10 of the first cable 35 is disposed inside a region surrounded by the eleventh element 311 of the first antenna 31 and the twenty-first element 321 of the second antenna 32 and along a side close to the first antenna 31 when viewed from the z direction (see FIG. 13). A member (part of the second body portion 36*a*, the second distal end region 36*b*, and the second ferrite core 36*c*) disposed inside the housing 10 of the second cable 36 is disposed inside a region surrounded by the eleventh element 311 of the first antenna 31 and the twenty-first element 321 of the second antenna 32 and along a side close to the second antenna 32 when viewed from the z direction. When viewed from the z direction, the first distal end region 35*b* of the first cable 35 and the second distal end region 36*b* of the second cable 36 are in an intersecting positional relationship. When viewed from the z direction, the first ferrite core 35*c* of the first cable 35 and the second ferrite core 36*c* of the second cable 36 are in a positional relationship of not overlapping each other.

(Effect of Two Cables being Held Adjacent to Each Other in Housing 10)

In a case where two cables (first cable 35 and second cable 36) are held in the housing 10 in a separated state and said two cables are bundled at a position away from the housing 10, there is a possibility that the electrical performance of the vehicular antenna device 1 varies depending on the location and the way of bundling. In the present embodiment, two cables are held in a predetermined region (a region near the left end portion) of one surface (first front surface portion 11*d*, second front surface portion 12*d*) of the housing 10. Therefore, said two cables are bundled on one surface of the housing 10. Therefore, the electrical performance of the vehicular antenna device 1 can be kept constant as compared with a form in which two cables are held in a separated state in the housing 10 and said two cables are bundled at a position separated from the housing 10.

(Effect of First Cable 35 and Second Cable 36 being Attached to Separate Cases)

The first antenna 31 is held by the first case 11, and the first body portion 35*a* of the first cable 35 is clamped by the first cable holding portion 11*i* of the first case 11. The second antenna 32 is held by the second case 12, and the second body portion 36*a* of the second cable 36 is clamped by the second cable holding portion 12*i* of the second case 12. Therefore, the vehicular antenna device 1 can be easily assembled only by overlapping the first case 11 to which the first antenna 31, the first cable 35, and the like are attached and the second case 12 to which the second antenna 32, the second cable 36, and the like are attached.

(Effect of Holding Two Cables at Substantially Same Height Position)

By the first cable holding portion 11*i*, the second cable holding portion 12*i*, and the like, two cables (first cable 35 and second cable 36) are configured to extend from the housing 10 to the outside at substantially the same height. Therefore, as compared with a form in which the two cables extend from the housing 10 to the outside at different height positions, wiring of said two cables is easily performed outside the housing 10.

(Effect of Arranging Cable Along Antenna)

A cable is disposed in a region surrounded by one element (eleventh element 311) constituting the first antenna 31 and one element (twenty-first element 321) constituting the second antenna 32 and at a position close to the electrically connected element. Specifically, the first cable 35 is disposed at a position close to the eleventh element 311, and the second cable 36 is disposed at a position close to the twenty-first element 321. Therefore, the cable is less likely to function as a scatterer as compared with a form in which the cable is disposed at a position away from the electrically connected element. Therefore, the electrical influence of said cable on the antenna can be reduced.

(Effect of Providing First Attachment Guide Portion 11*g* and Second Attachment Guide Portion 12*g*)

When the first case 11 and the second case 12 are overlapped with each other, the first attachment guide portion 11*g* and the second attachment guide portion 12*g* are first fitted to each other, and then contact between bosses 11*f* and the screw holes 12*f*, contact between the first left side surface portion 11*b* and the second left side surface portion 12*b*, and the like are performed. Therefore, since the first case 11 and the second case 12 can be aligned by fitting the first attachment guide portion 11*g* and the second attachment guide portion 12*g*, alignment of the bosses 11*f* and the screw holes 12*f*, alignment of the first left side surface portion 11*b* and the second left side surface portion 12*b*, and the like can be accurately performed. Therefore, when the first case 11 and the second case 12 overlap each other, it is possible to prevent an element constituting the first antenna 31 or an element constituting the second antenna 32 from erroneously coming into contact with another member.

(Effect of Providing First Inclined Region 11*k* and Second Inclined Region 12*k*)

When the element of the antenna is attached to the case, it is possible to easily perform hooking between the protrusion of the case and the hole of said element while pushing a part of said element into the inclined region and releasing the pushed state. For example, when the eleventh element 311 of the first antenna 31 is attached to the first case 11, it is possible to easily perform hooking between the first claw 11*n* of the first case 11 and the first claw hole 31*b* of the eleventh side portion 311*b* while pushing a part of the eleventh element 311 (connection region between the eleventh side portion 311*b* and the eleventh upper portion 311*c*) into the first inclined region 11*k* and releasing the pushed state. Further, when the twenty-first element 321 of the second antenna 32 is attached to the second case 12, it is possible to easily perform hooking between the second claw 12*n* of the second case 12 and the second claw hole 32*b* of the twenty-first side portion 321*b* while pushing a part of the twenty-first element 321 (connection region between the twenty-first side portion 321*b* and the twenty-first lower portion 321*c*) into the second inclined region 12*k* and releasing the pushed state. Therefore, the element of the antenna can be fixed to the case without using the screws, and the influence on the electric performance by using the screws can be minimized.

(Effect that First Claw 11*n* is Located Closer to End Portions on the Lower Side in z Direction of First Left Side Surface Portion 11*b* and First Right Side Surface Portion 11*c*)

As compared with the form in which the first claw 11*n* is located away from the end portion on the lower side in the z direction, the first claw 11*n* can be hooked at a position close to the end portion on the lower side in the z direction of the side portion (eleventh side portion 311*b* to fourteenth side portion 314*b*) of the first antenna 31, that is, at a position away from the connection region between the side portion and the upper portion (eleventh upper portion 311*c* to fourteenth upper portion 314*c*) of the first antenna 31. Therefore, the first antenna 31 can be hooked to the first claw 11*n* with little deflection (deformation) of the side portion of the first antenna 31, and the assemblability is improved.

(Effect that Second Claw 12*n* is Located Closer to End Portions on Upper Side in z Direction of Second Front Surface Portion 12*d* and Second Rear Surface Portion 12*e*)

As compared with the form in which the second claw 12*n* is located away from the end portion on the upper side in the z direction, the second claw 12*n* can be hooked at a position close to the end portion on the upper side in the z direction of the side portion (twenty-first side portion 321*b* to twenty-fourth side portion 324*b*) of the second antenna 32, that is, at a position away from the connection region between the side portion and the lower portion (twenty-first lower portion 321*c* to twenty-fourth lower portion 324*c*) of the second antenna 32. Therefore, the second antenna 32 can be hooked to the second claw 12*n* with little deflection (deformation) of the side portion of the second antenna 32, and assemblability is improved.

(Effect of Providing Cable Guide Portion)

The first distal end region 35*b* of the first cable 35 is held by the first cable guide portion 11*h* in a bent state. The second distal end region 36*b* of the second cable 36 is held by the second cable guide portion 12*h* in a bent state. Therefore, even if a tensile force is applied to the cable from the outside of the housing 10, said tensile force is less likely to directly reach the substrate, and breakage of said substrate is easily prevented.

(Effect of Providing Difference in Dimension in z Direction Between Surface Perpendicular to x Direction and Surface Perpendicular to y Direction of Housing 10)

When the first case 11 and the second case 12 are attached, an attachment error in the x direction and the y direction hardly occurs. In addition, the second attachment guide portion 12*g* can protrude largely upward in the z direction as compared with the second left side surface portion 12*b* and the second right side surface portion 12*c*. Therefore, when the first case 11 and the second case 12 are attached, the first attachment guide portion 11*g* can be easily brought close to the second attachment guide portion 12*g*.

(Application Example of Antenna)

The two antennas (first antenna 31, second antenna 32) included in the antenna unit 30 are not limited to those illustrated in the present embodiment, and can be applied to other shapes.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

According to the present specification, the following aspects are provided.

(First Aspect)

A vehicular antenna device includes: a first antenna; a second antenna; a first cable for the first antenna; a second cable for the second antenna; and a housing that holds the first antenna and the second antenna. The first cable and the second cable are held in a predetermined region of one surface of the housing.

According to the first aspect, two cables are held in a predetermined region of one surface of the housing. Therefore, said two cables are bundled on one surface of the housing. Therefore, the electrical performance of the vehicular antenna device can be kept constant as compared with a form in which two cables are held in a separated state in the housing and said two cables are bundled at a position separated from the housing.

(Second Aspect)

Preferably, the housing includes a first case that holds the first antenna and a second case that holds the second antenna. When the first case and the second case are overlapped with each other, the first cable and the second cable are arranged side by side in a second direction perpendicular to a first direction in which the first case and the second case are arranged side by side.

According to the second aspect, the vehicular antenna device can be easily assembled only by overlapping the first case that holds the first antenna and the second case that holds the second antenna. In addition, the two cables (first cable and second cable) are configured to extend from the housing to the outside side by side. Therefore, as compared with a form in which the two cables are configured to extend from the housing to the outside without being arranged side by side, wiring of said two cables is easily performed outside the housing.

(Third Aspect)

More preferably, the first cable is disposed along a side close to the first antenna in a region surrounded by at least a part of the first antenna and at least a part of the second antenna inside the first case. The second cable is disposed along a side close to the second antenna in a region surrounded by at least a part of the first antenna and at least a part of the second antenna inside the second case.

According to the third aspect, the cable is less likely to function as a scatterer as compared with a form in which the cable is disposed at a position away from the antenna. Therefore, the electrical influence of said cable on the antenna can be reduced.

(Fourth Aspect)

Preferably, the first case has a first wall surface. The second case has a second wall surface. The first case includes a first attachment guide portion. The second case includes a second attachment guide portion fitted to the first attachment guide portion. The first attachment guide portion protrudes in the first direction compared to the first wall surface close to the first attachment guide portion. The second attachment guide portion protrudes in the first direction compared to the second wall surface close to the second attachment guide portion.

According to the fourth aspect, when the first case and the second case are overlapped with each other, the first attachment guide portion and the second attachment guide portion are first fitted. Therefore, the first case and the second case can be aligned by fitting the first attachment guide portion and the second attachment guide portion. Therefore, when the first case and the second case are overlapped with each other, it is possible to prevent the first antenna or the second antenna from erroneously coming into contact with another member.

(Fifth Aspect)

Preferably, at least one of the first case and the second case has an inclined region and a claw for hooking at least one of the first antenna and the second antenna. A recess of the inclined region increases toward the claw.

According to the fifth aspect, when the antenna is attached to the case, it is possible to perform hooking between the claw of the case and said element while pushing a part of said antenna into the inclined region and releasing the pushed state. Therefore, the antenna can be fixed to the case without using the screws, and the influence on the electric performance by using the screws can be minimized.

(Sixth Aspect)

More preferably, the claw is located in a region close to an end portion in the first direction of at least one wall surface of the first case and the second case.

According to the sixth aspect, the antenna can be hooked to the claw with little deflection (deformation) of the side portion of the antenna, and the assemblability is improved.

(Seventh Aspect)

Preferably, the first case includes a first cable guide portion that holds the first cable in a bent state. The second case includes a second cable guide portion that holds the second cable in a bent state.

According to the seventh aspect, even if a tensile force is applied to the cable from the outside of the housing, said tensile force is less likely to reach the member (substrate) at the tip of the cable, and breakage of said member is easily prevented.

(Eighth Aspect)

Preferably, the first case has an upper surface portion perpendicular to the first direction and a first wall surface perpendicular to the upper surface portion. The second case has a lower surface portion perpendicular to the first direction and a second wall surface perpendicular to the lower surface portion. The first antenna includes a first side portion attached to the first wall surface and an upper portion attached to the upper surface portion. The second antenna includes a second side portion attached to the second wall surface and a lower portion attached to the lower surface portion. The upper surface portion includes a first inclined region. The lower surface portion includes a second inclined region. The first wall surface includes a first claw for hooking the first side portion. The second wall surface includes a second claw for hooking the second side portion. In the first inclined region, a recess of the upper surface portion in the first direction increases toward the first claw. In the second inclined region, a recess of the lower surface portion in the first direction increases toward the second claw.

According to the eighth aspect, when the antenna is attached to the case, it is possible to perform hooking between the claw of the case and said element while pushing a part of said antenna into the inclined region and releasing the pushed state. Therefore, the antenna can be fixed to the case without using the screws, and the influence on the electric performance by using the screws can be minimized.

(Ninth Aspect)

More preferably, the first claw is located in a region closer to an end portion of the first wall surface in the first direction than the upper surface portion. The second claw is located in a region closer to an end portion of the second wall surface in the first direction than the lower surface portion.

According to the ninth aspect, the first claw can be hooked at a position away from a connection region between the first side portion and the upper portion of the first antenna. Therefore, the first antenna can be hooked to the first claw with little deflection (deformation) of the first side portion of the first antenna, and assemblability is improved. The second claw can be hooked at a position away from a connection region between the second side portion and the lower portion of the second antenna. Therefore, the second antenna can be hooked to the second claw with little deflection (deformation) of the second side portion of the second antenna, and the assemblability is improved.

REFERENCE SIGNS LIST

1 vehicular antenna device
10 housing
11 first case
**11*a*** upper surface portion
**11*b*** first left side surface portion
**11*c*** first right side surface portion
**11*d*** first front surface portion
**11*e*** first rear surface portion
**11*f*** boss
**11*g*** first attachment guide portion
**11*h*** first cable guide portion
**11*i*** first cable holding portion
**11*j*** first holding portion receiving region
**11*k*** first inclined region
**11*m*** first pin
**11*n*** first claw
12 second case
**12*a*** lower surface portion
**12*b*** second left side surface portion
**12*c*** second right side surface portion
**12*d*** second front surface portion
**12*e*** second rear surface portion
**12*f*** screw hole
**12*g*** second attachment guide portion
**12*h*** second cable guide portion
**12*i*** second cable holding portion
**12*j*** second holding portion receiving region
**12*k*** second inclined region
**12*m*** second pin
**12*n*** second claw
13 screw
30 antenna unit
31 first antenna
**31*a*** first pin hole
**31*b*** first claw hole
311 eleventh element
**311*a*** eleventh arm portion
**311*b*** eleventh side portion
**311*c*** eleventh upper portion
312 twelfth element
**312*a*** twelfth arm portion
**312*b*** twelfth side portion
**312*c*** twelfth upper portion
313 thirteenth element
**313*a*** thirteenth arm portion
**313*b*** thirteenth side portion
**313*c*** thirteenth upper portion
314 fourteenth element
**314*a*** fourteenth arm portion
**314*b*** fourteenth side portion

314*c* fourteenth upper portion
32 second antenna
32*a* second pin hole
32*b* second claw hole
321 twenty-first element
321*a* twenty-first arm portion
321*b* twenty-first side portion
321*c* twenty-first lower portion
322 twenty-second element
322*a* twenty-second arm portion
322*b* twenty-second side portion
322*c* twenty-second lower portion
323 twenty-third element
323*a* twenty-third arm portion
323*b* twenty-third side portion
323*c* twenty-third lower portion
324 twenty-fourth element
324*a* twenty-fourth arm portion
324*b* twenty-fourth side portion
324*c* twenty-fourth lower portion
33 first substrate
34 second substrate
35 first cable
35*a* first body portion
35*b* first distal end region
35*c* first ferrite core
36 second cable
36*a* second body portion
36*b* second distal end region
36*c* second ferrite core

The invention claimed is:

1. A vehicular antenna device comprising:

a first antenna;

a second antenna;

a first cable for the first antenna;

a second cable for the second antenna; and a housing that holds the first antenna and the second antenna, wherein the first cable and the second cable are held in a predetermined region of one surface of the housing, wherein the housing includes a first case that holds the first antenna and a second case that holds the second antenna, wherein, when the first case and the second case are overlapped with each other, the first cable and the second cable are arranged side by side in a second direction perpendicular to a first direction in which the first case and the second case are arranged side by side, wherein the first cable is disposed along a side close to the first antenna in a region surrounded by at least a part of the first antenna and at least a part of the second antenna inside the first case, and wherein the second cable is disposed along a side close to the second antenna in a region surrounded by at least a part of the first antenna and at least a part of the second antenna inside the second case.

2. The vehicular antenna device according to claim 1, wherein the first case includes a first cable guide portion that holds the first cable in a bent state, and wherein the second case includes a second cable guide portion that holds the second cable in a bent state.

3. A vehicular antenna device comprising:

a first antenna;

a second antenna;

a first cable for the first antenna;

a second cable for the second antenna; and a housing that holds the first antenna and the second antenna, wherein the first cable and the second cable are held in a predetermined region of one surface of the housing, wherein the housing includes a first case that holds the first antenna and a second case that holds the second antenna, wherein, when the first case and the second case are overlapped with each other, the first cable and the second cable are arranged side by side in a second direction perpendicular to a first direction in which the first case and the second case are arranged side by side, wherein the first case has a first wall surface, wherein the second case has a second wall surface, wherein the first case includes a first attachment guide portion, wherein the second case includes a second attachment guide portion fitted to the first attachment guide portion, wherein the first attachment guide portion protrudes in the first direction compared to the first wall surface close to the first attachment guide portion, and wherein the second attachment guide portion protrudes in the first direction compared to the second wall surface close to the second attachment guide portion.

4. The vehicular antenna device according to claim 3, wherein the first case includes a first cable guide portion that holds the first cable in a bent state, and wherein the second case includes a second cable guide portion that holds the second cable in a bent state.

5. A vehicular antenna device comprising:

a first antenna;

a second antenna;

a first cable for the first antenna;

a second cable for the second antenna; and a housing that holds the first antenna and the second antenna, wherein the first cable and the second cable are held in a predetermined region of one surface of the housing, wherein the housing includes a first case that holds the first antenna and a second case that holds the second antenna, wherein, when the first case and the second case are overlapped with each other, the first cable and the second cable are arranged side by side in a second direction perpendicular to a first direction in which the first case and the second case are arranged side by side, wherein at least one of the first case and the second case has an inclined region and a claw for hooking at least one of the first antenna and the second antenna, and wherein a recess of the inclined region increases toward the claw.

6. The vehicular antenna device according to claim 5, wherein the claw is located in a region close to an end portion in the first direction of at least one wall surface of the first case and the second case.

7. The vehicular antenna device according to claim 5, wherein the first case includes a first cable guide portion that holds the first cable in a bent state, and wherein the second case includes a second cable guide portion that holds the second cable in a bent state.

* * * * *